United States Patent
Witana et al.

(10) Patent No.: US 11,743,099 B2
(45) Date of Patent: *Aug. 29, 2023

(54) SYSTEMS, METHODS AND DEVICES FOR NETWORKED MEDIA DISTRIBUTION

(71) Applicant: Audinate Holdings Pty Limited, Ultimo (AU)

(72) Inventors: Geetha Varuni Witana, Kings Langley (AU); James Henry Westendorp, Chirnside Park (AU); Christopher Ware, Thirroul (AU); Muhammad Naeem Bacha, Windradyne (AU)

(73) Assignee: Audinate Holdings Pty Limited, Ultimo (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,730

(22) Filed: Jul. 15, 2021

(65) Prior Publication Data

US 2022/0045897 A1  Feb. 10, 2022

Related U.S. Application Data

(63) Continuation of application No. 16/478,784, filed as application No. PCT/AU2018/050030 on Jan. 17, 2018, now Pat. No. 11,102,051.

(Continued)

(51) Int. Cl.
*H04L 41/04* (2022.01)
*H04L 7/00* (2006.01)
(Continued)

(52) U.S. Cl.
CPC ............ *H04L 41/04* (2013.01); *H04L 7/0016* (2013.01); *H04L 41/0213* (2013.01);
(Continued)

(58) Field of Classification Search
CPC ... H04L 41/04; H04L 41/0213; H04L 41/069; H04L 41/0893; H04L 41/20; H04L 43/045; H04L 63/20; H04L 63/08; H04L 7/0016

See application file for complete search history.

(56) References Cited

U.S. PATENT DOCUMENTS 6,335,927 B1 * 1/2002 Elliott .................. H04L 63/102
                                                              370/352
7,181,620 B1 * 2/2007 Hur ...................... H04L 63/061
                                                              713/168

(Continued)

OTHER PUBLICATIONS

Supplementary European Search Report dated Oct. 23, 2020 for PCT/AU2018/050030.

(Continued)

*Primary Examiner* — Minh Chau Nguyen
(74) *Attorney, Agent, or Firm* — Jones Day

(57) ABSTRACT

A domain manager configured to manage and/or configure an audio-video (AV) system but not directly participate in networked media transmission or clock synchronization. The domain manager may include a database; an endpoint manager configured to communicate with the database, the endpoint manager being configured to setup and maintain secure connections to and from media devices and controllers; and at least one management module configured to communicate with the database and provide services to the media devices and controllers. In embodiments, the at least one management module may include at least one of a manager for managing credentials and grouping devices into domains, a device directory for managing device registrations and lookup, and an access controller for managing and/or evaluating access control policy.

19 Claims, 19 Drawing Sheets

Related U.S. Application Data

(60) Provisional application No. 62/447,722, filed on Jan. 18, 2017.

(51) Int. Cl.
    *H04L 41/0213*    (2022.01)
    *H04L 41/069*     (2022.01)
    *H04L 41/0893*    (2022.01)
    *H04L 43/045*     (2022.01)
    *H04L 41/00*      (2022.01)
    *H04L 9/40*       (2022.01)
    *H04L 61/4511*    (2022.01)

(52) U.S. Cl.
    CPC ........ *H04L 41/069* (2013.01); *H04L 41/0893* (2013.01); *H04L 41/20* (2013.01); *H04L 43/045* (2013.01); *H04L 61/4511* (2022.05); *H04L 63/20* (2013.01); *H04L 63/08* (2013.01)

(56) References Cited

U.S. PATENT DOCUMENTS

| | | | |
|---|---|---|---|
| 7,466,710 B1 * | 12/2008 | Clemm | H04M 7/1245 370/410 |
| 8,260,575 B2 * | 9/2012 | Walters | G06Q 30/04 700/83 |
| 2002/0157002 A1 | 10/2002 | Messerges et al. | |
| 2016/0301680 A1 * | 10/2016 | Main | H04W 4/02 |

OTHER PUBLICATIONS

Dante Controller User Guide, XP055446295, Retrieved from the internet Jan. 30, 2018, URL: http://web.archive.org/web20150626101900/http://dev.audinate.com/GA/dant-controller/userguide/pdf/latest/AUD-MAN-DanteController-3.5x-v1.6.pdf. 84 pages, Dec. 16, 2014.

\* cited by examiner

FIG. 13

SYSTEMS, METHODS AND DEVICES FOR NETWORKED MEDIA DISTRIBUTION

CROSS-REFERENCE TO RELATED APPLICATIONS

This application is a continuation of U.S. application Ser. No. 16/478,784, filed Jul. 17, 2019, which is the National Phase Application of International Application No. PCT/AU2018/050030, filed Jan. 17, 2018, which designates the US and was published in English, which claims priority to U.S. Provisional Application No. 62/447,722, filed on Jan. 18, 2017. This application is related to International Application No. PCT/AU2015/000345, filed on Jun. 10, 2015 and published as WO 2015/188220. These applications are herein incorporated by reference in their entirety.

FIELD

This relates to systems, methods, and devices for networked media distribution. More particularly, this relates to systems, methods and devices for large scale networked media (e.g., audio, video, etc.) distribution.

BACKGROUND

Media signals, such as audio and video signals have historically been difficult to share across a network because media signals prefer networks with both low latency and accurate time alignment. Existing techniques for sharing media signals have been limited to small groups of devices. These techniques are generally unmanaged (e.g., plug-and-play) to simplify the setup for the user. While a plug-and-play system has some advantages, it compromises many features that could otherwise be available because the complex logic is not built into the simple end devices.

While it is possible to make the end devices more complex, this is not generally desired because it may increase latency, the complexity and/or the cost of the end devices. Accordingly, it may be desirable to have systems, methods and devices, capable of large scale networked media distribution that do not suffer from one or more of these drawbacks.

SUMMARY

Some embodiments described herein may provide for a method, device or system for providing automated configuration of multi-subnet synchronization systems as described herein.

Some embodiments described herein may provide for a method, device or system for providing active management of a large scale media system as described herein.

Some embodiments described herein may provide for a method, device or system for providing fault tolerant operation of a large scale media system wherein a central management server may not be present. (e.g., devices sensibly caching and operating with known good parameters etc.) as described herein.

Some embodiments described herein, may provide for a domain manager configured to manage and/or configure an audio-video (AV) system but not directly participate in networked media transmission or clock synchronization. The domain manager may include a database; an endpoint manager configured to communicate with the database, the endpoint manager being configured to setup and maintain secure connections to and from media devices and controllers; and at least one management module configured to communicate with the database and provide services to the media devices and controllers. In embodiments, the at least one management module may include at least one of a domain manager for managing credentials and grouping devices into domains, a device directory for managing device registrations and lookup, and an access controller for managing and/or evaluating access control policy.

BRIEF DESCRIPTION OF THE DRAWINGS

Aspects of the present disclosure are best understood from the following detailed description when read with the accompanying figures.

FIG. 13 illustrates an example audit log in accordance with some embodiments described herein.

DETAILED DESCRIPTION

Figure 1:
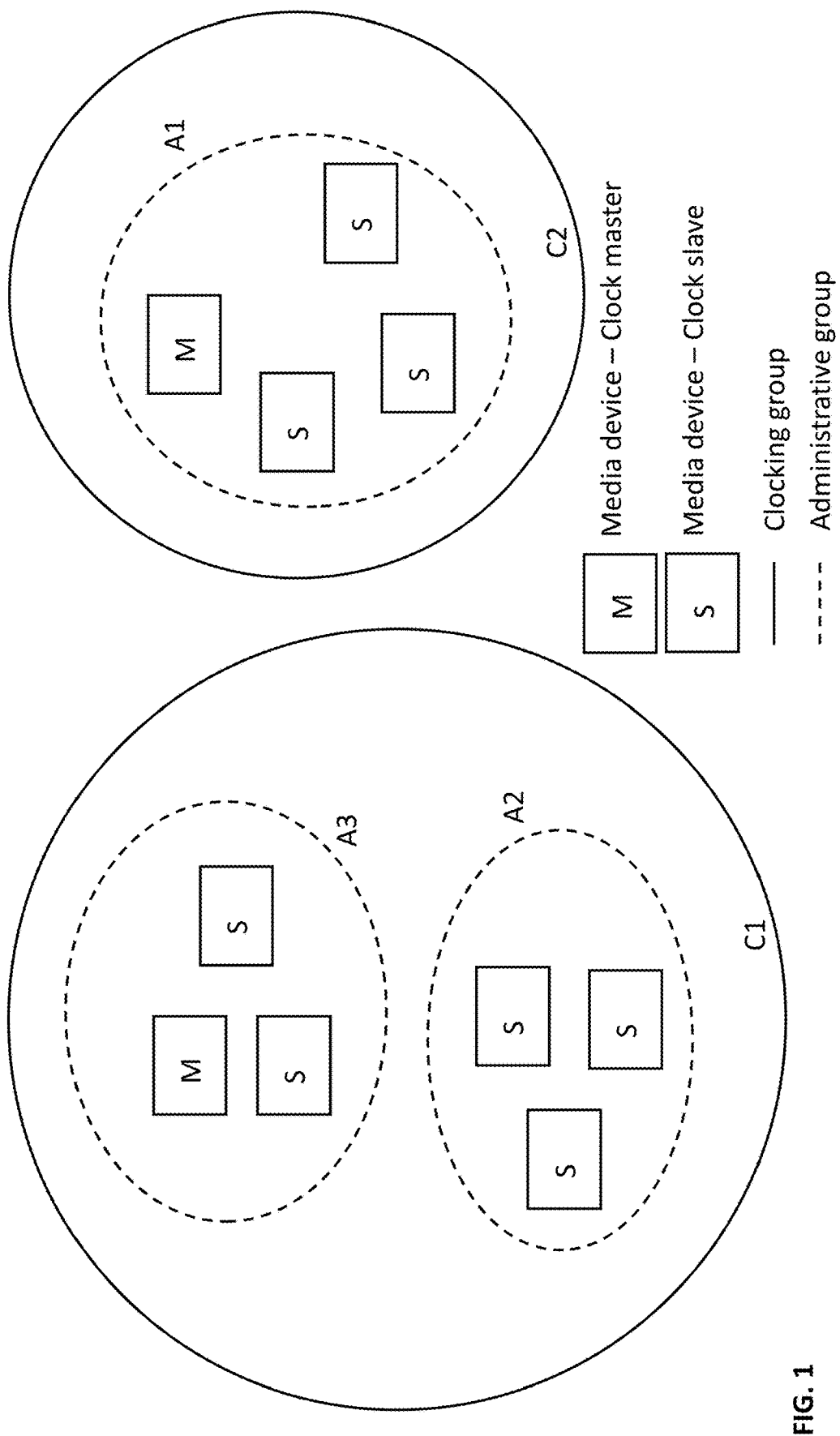
FIG. 1 illustrates an example of a grouping of media devices in accordance with some embodiments described herein.

The following disclosure provides many different embodiments, or examples, for implementing different features of the provided subject matter. Specific examples of components and arrangements are described below to simplify the present disclosure. These are, of course, merely examples and are not intended to be limiting.

Media signals, such as audio and video signals have historically been difficult to share across a network because media signals prefer networks with both low latency and accurate time alignment. Existing techniques for sharing media signals have been limited to small groups of devices (e.g., subnets). These techniques are generally unmanaged (e.g., plug-and-play) to simplify the setup for the user. For example, in some systems, once a device is plugged in, the device may be automatically recognized and configured. While a plug-and-play system has some advantages, it compromises many features that could otherwise be available because the complex logic is not built into the simple end devices. As a result, many of the features that may otherwise be available (e.g., access control), may not be implemented in the network.

While it is possible to make the end devices more complex, this is not generally desired because it may increase latency, the complexity and/or cost of the end devices. As described herein, a domain manager may be capable of managing a collection of end devices to create an administrative group called a domain. The end devices selected for a particular domain may not be limited to a particular subnet but may instead come from a more expansive wide area network (WAN). this administrative grouping by the domain manager may enable more complex features to be implemented within the network. Additionally, since the domain manager is a part of the control and setup process but not part of the communication process, latency remains minimal and the time alignment remains accurate.

In some embodiments, the domain manager described herein may be implemented in software, hardware, and/or a combination of hardware and/or software. Additionally, the domain manager may be part of a local computer (e.g., laptop or rack mounted computer), it may be installed on a virtual machine, or it may reside as hardware/software in the cloud.

In some embodiments the domain manager may provide one or more beneficial features to the network. Examples of some of the features of the domain manager and operation and architecture of the domain manager are discussed below.

1. Features

In some embodiments, the domain manager (DM or DDM) may be a hardware and/or software entity that enables effective communication within large scale networked media systems. Media systems (e.g., Dante) may benefit from low latency from a signal input to a signal output and/or accurate time alignment between the media signals. To support low latency, the network may be configured to support media signals with high rates of small packets. To support accurate time alignment, networked media systems may benefit from hardware timestamping of clock synchronization packets to improve synchronization accuracy.

The domain manager may be configured to manage and configure an audio-video (AV) system but may not directly participate in networked media transmission or clock synchronization. In some embodiments, this may be an advantage because it allows the domain manager to be virtualized and/or provided as a service delivered by cloud technology. In other words, in some embodiments, the domain manager may not be constrained by specialized hardware requirements or stringent performance requirements.

In some embodiments, the domain manager may enable one or more of the following features:
1. Networked media distribution over routed networks.
2. Management of large scale media networks.
3. Fault tolerant media networks.

Each of these features are discussed in more detail below.

1.1. Networked Media Distribution Over Routed Networks 1.1.1. Synchronizing Local Clock Masters In Multiple Subnets In some embodiments, when connecting local clock masters in different network subnets into a single clock tree, it may be more efficient to use unicast communication rather than multicast communication. However, using unicast may have several disadvantages that the domain manager described herein may be configured to overcome.

Configuring Unicast Masters

In some embodiments, using unicast may require that the local clock masters are configured with the IP addresses of its peers. This can be cumbersome and error prone if performed manually. In some embodiments, the domain manager may facilitate error-free manual configuration and further provide automated configuration by one or more of the following means:
  a. Registration of unicast capable devices and their capabilities with the domain manager;
  b. presentation of a list of such devices and their capabilities so a domain manager administrator can select the most suitable devices as local clock masters;
  c. Automatic selection of the best candidates to act as subnet-local clock masters based on their relative capabilities;
  d. Managing the clock peer configuration by updating the subnet-local clocks with an updated list of IP addresses of its peers whenever the list changes; and/or
  e. Notifications related to clocking misconfiguration.

Multiple Candidate Unicast Masters

In some embodiments, it may be desirable that subnets include more than one master clock. This could be performed by the domain manager administrator or automatically by selecting multiple of the best candidates in each subnet.

Inefficiency of Unicast Communication

In some embodiments, the subnet local clocks may need to communicate with its peers in other subnets to exchange unicast clocking messages. If multiple candidate unicast masters are present in a subnet, it may be desirable that any candidates not currently considered a master remain passive until the currently active master becomes unavailable. This configuration may decrease both the total unicast traffic between subnets and the load on the grandmaster that needs to send clock synchronization messages to unicast capable devices in other subnets. If all candidate masters are always active the total number of subnets that can be supported in the media network is reduced.

Temporary Unavailability of the Domain Manager

In some embodiments, it may be desirable for the media flows (and clocking) to be maintained even if the domain manager is temporarily unavailable. Accordingly, in some embodiments, it may be possible for the system to detect and switch to another unicast-capable master (from the previously selected candidates) even if the domain manager is not present.

1.1.2. Device Discovery Across Subnets

Routable transport protocols may allow media signals to be transmitted and received across IP subnets. However setting up of these media streams may require a media device to be able to discover device addresses and channel information of another media device that may be connected to a different subnet in order to be able to setup a media stream to/from it; and a controller to be able to discover media devices that may be on different subnets in order to configure media flows and other parameters on these devices.

Domain Name System-Service Discovery (DNS-SD) may be used for this purpose, however DNS-SD is limited in its ability to handle rich metadata and to provide prompt notification when media devices are connected and disconnected from the network. In some embodiments, the domain manager may incorporate a device metadata database and associated processes that may be reactive to changes in device metadata. If this is the case, the domain manager may include one or more of the following advantages:

1. Prompt notification to controllers and other devices when media devices are connected and disconnected from the network, or when media device metadata changes. This allows prompt update of controller user interfaces and prompt re-creation of media flows when needed, given the new metadata values.

2. Allowing controllers to discover a subset of the media devices in a large network, where that subset is defined using flexible queries based on device metadata. For e.g. discovery of devices that belong to a particular manufacturer, devices in a particular subnet, devices operating at a particular sample rate etc.

1.1.3. Bootstrapping a Secure Media Network

In a large media network it may be important to secure control communications against tampering by encrypting the communication paths between devices, control endpoints and the domain manager. In some embodiments, to achieve this, the domain manager may need to solve one or more of the following two problems—bootstrapping and key distribution.

In connection with bootstrapping, media devices and/or controllers may need to discover the domain manager even if the domain manager is in a different subnet. This could be performed be manually configuring each endpoint with the IP address of the domain manager but this would become unmanageable in large systems. In some embodiments, it may be possible to automatically bootstrap devices by using a service such as a DHCP server to distribute additional configuration information to each endpoint at the same time they acquire an IP address. In other embodiments the devices may discover the DDM via DNS-SD, which may use multicast (mDNS) if the domain manager is operating in a single subnet network or a DNS service record configured in DNS server in the case the domain manager is operating in a network with multiple subnets. In the latter case the DHCP server may be used to distribute the address of the DNS server to the devices. With respect to key distribution, media devices may require encryption keys so that secure communication channels can be established. In some embodiments, the domain manager may be used to enable simple secure key generation and distribution to devices; support cryptographic authentication of devices (e.g., enabling the revocation of keys, for example when removing a device from a domain); build chains of trust where devices are grouped into domains; and/or offload computationally intensive cryptographic operations from resource constrained devices.

1.2. Manage A Large Scale Media Network

In some embodiments, a traditional media network (e.g., a Dante network) may have distributed control and monitoring functionality. For example, a large scale media network with many devices and/or subnets may suffer from an increase in the complexity of the network and the need for better management tools. In some embodiments, the domain manager may facilitate network management by centralizing information and/or control of devices in a networked media system. As a result, one or more features may be enabled by the domain manager.

Virtualizable

In some embodiments, the domain manager may be implemented in software and may be configured to manage clocking configuration and media configuration. However, the domain manager may not directly participate in either. As such, the domain manager may not have specific hardware requirements such as access to precision timestamping making the domain manager a candidate for virtualization.

Security/Access Control Policies

In a large scale media network there may be many active controllers and many users who have access to the network. In such an environment it may be desirable to ensure that the media network is secured against un-authorized access and configuration changes. In some embodiments, the domain manager may provide one or more of the following functions to manage access to a media system:

1. The ability for a network administrator to define access control policies. Such policies may specify access to a limited set of devices; to particular configuration parameters on a device, and/or particular channels on a device.

2. The ability for a network administrator to assign access control policies to security principals. Security principals could be users (e.g., with associated passphrases/keys), device keys (for controller embedded within media devices), and/or controller API keys (e.g., for controllers that do not support the ability for user login—such as a wall mounted controller).

3. The ability to evaluate access control policies on the domain manager by forwarding configuration messages via the domain manager. This may permit complex, fine grain access control policies to be enforced. Such policies may be too complex to evaluate on resource constrained media devices.
4. The ability for access control policies to be pushed from the domain manager to media devices so they can be cached and evaluated on the device without requiring the configuration message to be forwarded via the domain manager.
5. The ability to manage a database of users/passwords/roles/access keys that can be used to assign access controls.
6. The ability to connect to an external sign-on service such as active directory to authenticate and manage users.

Audit Logs

Where configuration change is permitted by policy, the domain manager may also maintain an audit log of configuration changes. Unlike any logging maintained by the main controller (e.g., a Dante Controller), the domain manager logs may not be lost when the domain manager is restarted and can be managed appropriately by an administrator.

In some embodiments, the audit logs may provide one or more of the following functions:
1. The ability to log who/what/when messages for any configuration changes made where the configuration message is forwarded via the domain manager to the media device.
2. The ability to log audit trail messages for configuration changes where the configuration change happens internally on a device based on cache policy.
3. The ability to combine this log with system events that occur on media devices whether directly related to configuration commands or due to changes in the network environment.
4. The ability to search and analyze these logs for the purposes of accountability/reconstruction/problem detection etc.
5. The ability to interface via appropriate APIs with external data analytic services to better analyze and visualize this information.
6. The ability to use appropriate data storage architectures such as time series databases so that the data can be easily analyzed and aggregated.
7. The ability to be able to generate alerts in the event of significant events. These alerts may be delivered by multiple means such as SMS, email, SNMP traps etc.
8. The ability to connect audit trail information to dashboard widgets that display information in a graphical format for the purposes of visualization.
9. The ability to generate contextual alerts in response to user defined search queries of audit trail events.
10. The ability to generate an audit trail message in the event of an unknown non-domain-aware device being detected within the system.
11. The ability to generate an audit trail message in the event of an unknown domain-aware device being connected to the system.
12. The ability to generate an audit trail message when a user authenticates with the domain manager.
13. The ability to generate an audit trail message when a user has too many failed authentication attempts.

Statistics/Health Monitoring

In some embodiments, media devices may be capable of generating statistics and performance information which can be used to analyze and/or troubleshoot errors in a media network. Control and monitoring applications may display this information with appropriate visualizations such as histograms, warning indicators etc. A large media network may have many controllers active. In a smaller network, devices may multicast such information so that they can be received by the multiple controllers, but this does not scale to large scale media systems. In some embodiments, the domain manager may improve the collection and display of such information in one or more of the following ways:
1. Control and monitoring applications may not always be present on the network, if that is the case historical information may be lost. The domain manager may act as a centralized storage for this information.
2. Control and monitoring applications can connect to the domain manager to collect both live and historical information.
3. The domain manager may be able to interface via appropriate APIs with external data analytic services to better analyze and visualize this information.
4. The domain manager may be able to use appropriate data storage architectures such as time series databases so that the data can be easily analyzed and aggregated.
5. The domain manager may be able to generate alerts in the event of errors or performance information reaching particular thresholds. The alerts may be delivered by multiple means such as email or SMS.
6. The domain manager may be able to convert such alerts to a form such as for example simple network management protocol (SNMP) traps such that they can be received by third party network management tools. This is possible without requiring the media devices to support SNMP directly.

Non-Interference

In some embodiments, it may be desirable to sub-divide large media systems into smaller, logically separate sub-systems consisting of groups of devices called domains. In some embodiments, a single domain manager can manage multiple domains. Domains may support administrative grouping and/or clocking isolation. In administrative grouping, users may be assigned different roles in different domains. These roles may constrain their capability to configure and monitor these domains. With respect to clocking isolation, it may be desirable to maintain independent groups of devices on the same physical network without the need to configure VLANs in a manner that each domain has its own master clock and that changes to clocking in one domain do not interfere with another As illustrated in FIG. 1, media devices may be grouped into 3 administrative groups A1, A2 and A3 and 2 clocking groups C1 and C2. Users of the systems U1, U2 may be assigned different access rights to each administrative group. For example U1 may have rights to configure devices in A2 and A3 but no rights to access the media devices in A1 and user U2 may have rights to configure devices in A1 and guest rights that only permit viewing of media device configuration in A2 and A3.

As illustrated in FIG. 1, media devices may be grouped into 2 clocking groups, a devices clocking group is identified in the clocking messages exchanged between devices. A clocking group may use a different multicast address to exchange clocking messages, a clocking group may only be configured with the unicast addresses of peers in its own group. A device may ignore any clocking messages received that are not it the same clocking group as it. In this way a clocking group is isolated from other media devices that may be on the same network. Each clocking group may establish its own clock master. A device in its own group will either receive or ignore clocking messages from devices outside its group, its clocking may be isolated from changes in device outside the group.

Audio between domains

The ability to sub-divide a large media system into separate administrative domains may be important in an environment with a diverse group of users. However, there is a use case for users in one domain to have access to only certain devices (or specific audio channels on a device) in the other domain without allowing them full access to that domain. For example, two rooms in a conference center are usually maintained as two separate spaces and managed by different users. However, in some instances the second conference room may be configured as an overflow room for the main room. In this case a user with access only to the second room may need to configure outputs in the second room to receive from certain inputs in the first room; without having configuration privileges in the first room. In order to achieve this, a user in the first domain (room) may "project" certain devices or specific channels on a device to be visible in one or more other domains. This may be achieved by the device directory module exposing some devices or channels in one domain to controllers/devices in the second domain as "virtual devices" which may only expose specific channels of the underlying device. A user accessing a controller attached to the second domain will see these "virtual devices" and be able to exchange audio between this virtual device and physical devices in the domain. Thus, a user in one domain can access to certain devices/channels in another domain without requiring total visibility/access to that domain.

Figure 19:
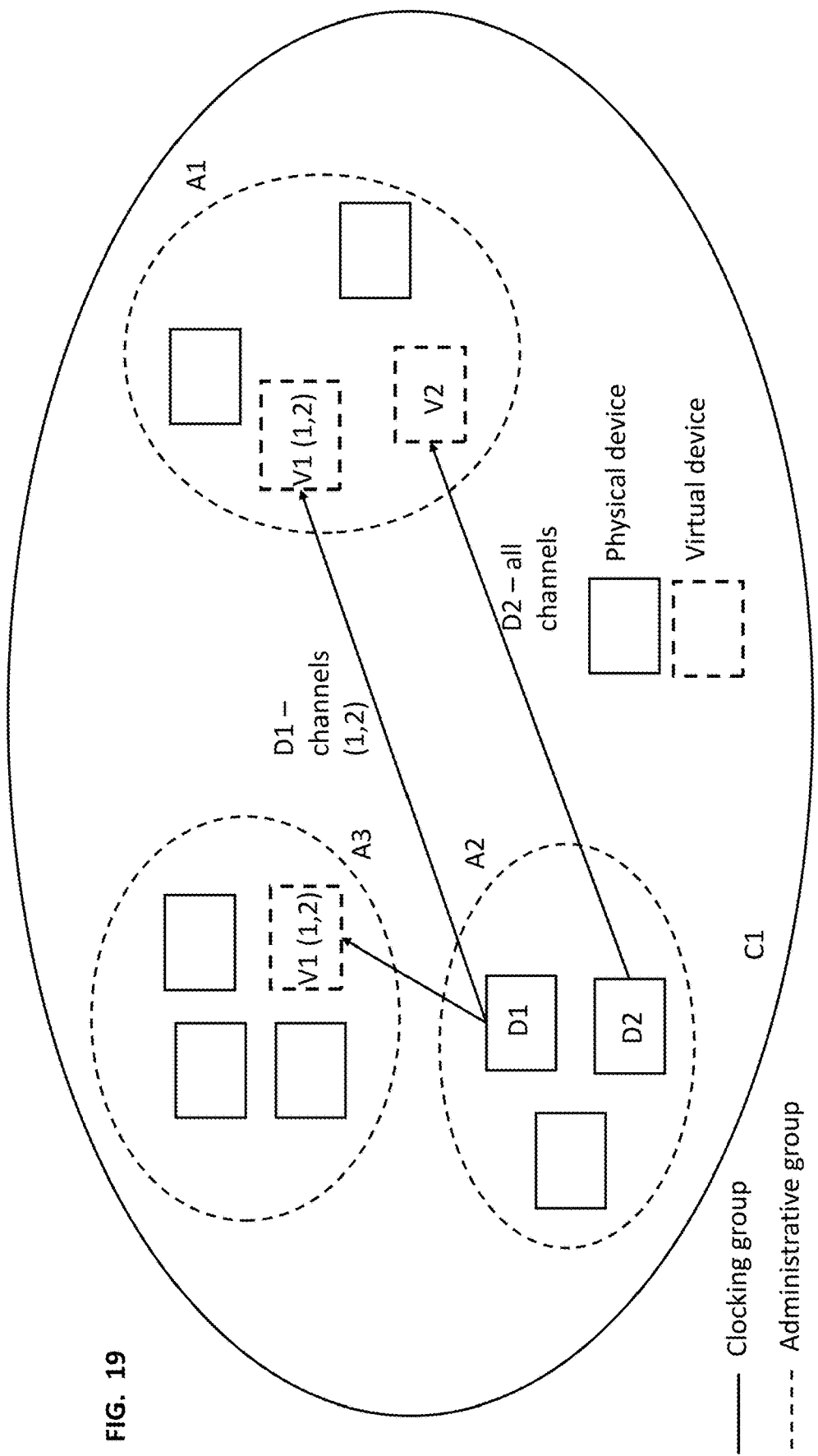
FIG. 19 illustrates an example of a grouping of media devices in accordance with some embodiments described herein.

An example configuration is illustrated in FIG. 19, which includes 3 administrative domains A1, A2 and A3. As illustrated, a user in A2 has projected the device D2 as the virtual device V2. Thus a user in A1 will see an additional virtual device in domain A1 and will be able to configure devices within A1 to exchange audio with this device V2. In reality the audio is actually exchanged from the physical device D2 backing this virtual device V2. A user in A1 is also able to project only certain channels of a device, for example, channels 1 and 2 of D1 may be projected as virtual channels into both domains A1 and A3. Thus a user in A1 or A3 may configure devices in their respective domains to exchange audio between devices in the domain and channels 1 and 2 of D1 but not other channels.

Limited Interoperability with Legacy Firmware

In some embodiments, the functionality provided by the domain manager may require that firmware on media devices are updated to become domain-aware. It may be desirable to account for transition scenarios, in which devices are upgraded gradually. Accordingly, in some embodiments, the domain manager may be able to handle both legacy and domain-aware devices. For example, it may be possible to send and receive media from selected media devices/channels that are not domain-aware and are thus operating outside a domain. It may also be possible for the network administrator to configure access policies to enable such functionality only when required as this may alter the security model the system. In some embodiments, it may also be possible to configure clocking on non domain-aware devices such that they share a common clock with devices within a domain.

Interoperability with 3$^{rd}$ Party Devices

In some embodiments it is possible that domain unaware devices are 3$^{rd}$ party devices that can interoperate with Dante devices using protocols such as AES67/SMPTE2110.

Tie-Lines

In some embodiments, when devices are grouped into domains, each domain may have an independent clock and thus it may not be possible to setup isochronous media flows between devices in different domains. A tie line (see, FIG. 2) is a method used to transport media content between systems operating in independent clock domains. A tie line is typically defined by a number of audio signals grouped together and transported between systems in a single session. The tie line may utilize technologies such as sample rate conversion, media compression, and/or media re-timing using an incoming packet stream.

In some embodiments, it may be desirable to connect a number of media signals between independent domains. In this case, a component may be required that can re-time media signals between the two clock domains. This component may reside within the domain manager or may be an entity controlled by the domain manager (e.g., a software instance based on Dante Via that is controlled by the domain manager).

In some embodiments, the domains may be connected via a low bandwidth network connection. In that case the intervening device may also use media compression technologies.

Figure 2:
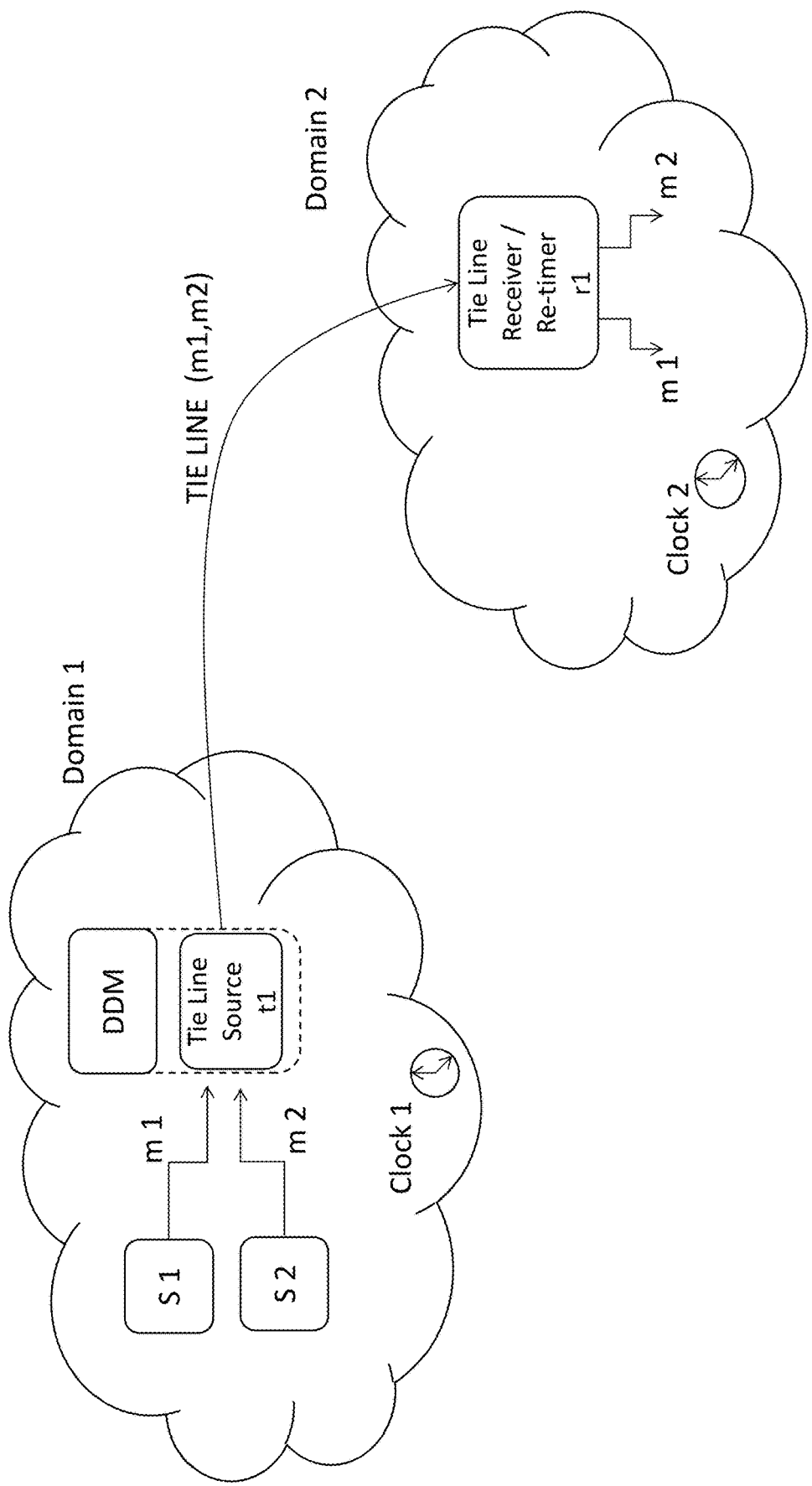
FIG. 2 illustrates an example of a domain manager and two domains coupled together with a tie line in accordance with some embodiments described herein.

The domain manager may also be able to manage configuration and connection of streams passed through a media re-timer within domains it is managing. FIG. 2 illustrates an example system in which media signals m1 and m2 are sourced from media sources s1 and s2 respectively. The tie line source t1 will aggregate these signals to generate the tie line packet stream. The tie line source t1 may compress or encode the media for transmission over the tie line. The receiving media re-timing device r1 receives the tie line and terminates the tie line packet stream. The receiving device r1 may regenerate a synchronous clock using the incoming tie line packet stream. The receiving device r1 may employ asynchronous sample rate conversion to match the rate of the media signals m1 and m2 to the playout clock domain, clock 2. The domain manager of domain 1 may assume responsibility for configuring the tie-line source, including which media signals are included within the tie line. The domain manager of Domain 1 may include the tie line source device t1. A Domain manager may include a media re-timer capable of receiving a tie line.

With reference to FIG. 2, if domains 1 and 2 are managed by the same domain manager instance, it may be possible for the domain manager to assume management of the tie-line between the domains. In some embodiments, this may allow simplified exchange of media streams across a synchronous clock boundary.

In some embodiments, the receiving device r1 may be a device that is not managed by a domain manager. In the case where the destination domain (i.e. domain 2 in FIG. 2) is not managed by the domain manager responsible for the source domain (i.e. domain 1 in FIG. 2) the domain manager may be able to provide a number of advertisements, using technologies such as multicast mDNS, session announce protocol (SAP) or session description protocol ((SDP) etc. that a controller responsible for the receiver domain may utilize to establish a connection.

The domain manager may also make an interface available that allows the operator to manually configure connection details such as the destination IP address and port, audio codec, compression parameters, etc.

In some embodiments, the domain manager may provide an interface for the system operator to select media channels that may be grouped into a single logical tie line connection.

Multicast Media Flows (Multicast Address Management and Multicast/Unicast Translation)

In some embodiments, if a media flow has many receivers it may be more efficient to use multicast instead of unicast. Multicast may be enabled across subnets by enabling multicast routing capability in the routers connecting the subnets. However, in some embodiments, a coordinated centralized approach to multicast address allocation may be required as a distributed protocol may not work across subnets. The domain manager can be used to perform multicast address allocation.

In some embodiments, there may be some receivers in the same subnet as the sender and other receivers on different subnets. In such a case it may be desirable to translate the multicast flow to unicast so it can be sent to the remote subnet. In addition it may be desirable to convert the unicast flow back into multicast in the remote subnet. In some embodiments, these operations may be controlled by the domain manager.

Device Configuration/Presets

Figure 3:
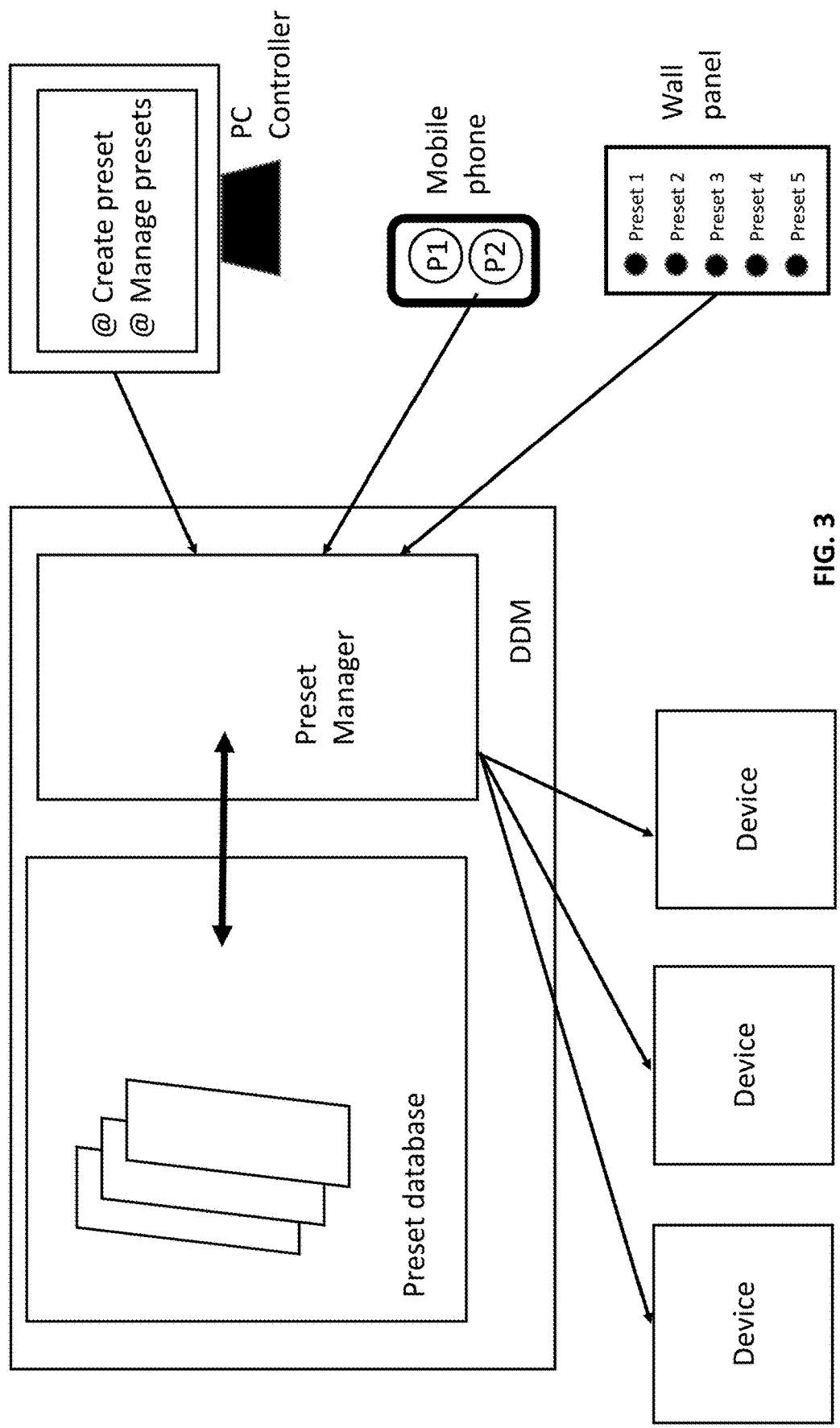
FIG. 3 illustrates an example of a domain manager and a preset manager in accordance with some embodiments described herein.

In some embodiments, the domain manager may be used as a centralized store for media network presets, allowing users to store desired configurations for part or all of a media network. The domain manager may manage the process of applying the required configuration to devices and handling errors that arise during the application of presets, as well as providing access control and audit logging for preset configurations. The domain manager may enable discovery and management of presets via user interfaces. In some embodiments, preset discovery and invocation may be triggered remotely—e.g. via a mobile phone or buttons on a wall panel. As illustrated in FIG. 3, the domain manager may contain a preset manager, this manages a database of presets, where an individual preset is a configuration setting for part or all of a media network. A user may use a controller to; create a preset, to list the available presets in the database and to apply a preset. In some embodiments a controller may be a mobile phone or a wall mounted panel where presets may be applied by clicking or physical or graphical buttons. When a controller applies a preset the domain manager applies the preset configuration to some or all of the media devices in that network by sending configuration messages to the affected devices and handling possible errors that may arise from the application of that preset—e.g., if a specified device is not present on the network at that time. When applying a preset the preset message is also passed via the access controller to check if the user has permission to apply this preset. The preset application is also logged in the audit log.

Firmware Management

In some embodiments, a large media network may consist of products (e.g., devices) from multiple manufactures and ensuring that these devices are running the latest firmware may be desirable. This may be a large management task for the network administrator. In some embodiments, the domain manager may be configured to perform one or more of the following functions:
 1. Update media device firmware even when the device is located in a remote subnet.
 2. Update media software securely over encrypted communication paths.
 3. Provide notifications on availability of new firmware by e.g., consulting a backend database.
 4. Ensure firmware compatibility with other devices on the media network.
 5. Manage rollbacks and recovery in event of update failures Vendor Plugins In a network of single manufacture devices (e.g., Dante devices) a controller such as the Dante Controller can be used to configure and monitor media flows. However some products have additional product specific configuration, for e.g. gain controls. In this case users may have to either use two (2) controllers or the product manufacturer may have to use Dante APIs to build an integrated controller that combines both Dante and custom control. For such a case it is advantageous for the domain manager to be a platform that can be used by a manufacturer to add a vendor specific "plugin" to existing control functionality provided via the domain manager.

Enable Audio Encryption

Certain media devices may have the ability to encrypt media streams. However the communicating devices may need to be configured with session based encryption keys. In some embodiments, the domain manager may be used to generate and manage session keys for media flows.

Flow Configuration

In some embodiments, the network devices may be able to operate with different flow configurations based on their capabilities or other system requirements. These flow configurations are typically static, or managed on a 'whole of device' basis, where the transmit flow configuration is adjusted for all flows. Flow configuration refers to the number of audio channels contained in the flow description, the number of samples contained within each packet, and the audio format used within the flow. In some embodiments, the domain manager may configure endpoints to use flow configurations that are adapted or otherwise optimized for the use case at hand. This can be performed on a per-flow basis within the operating domain. An example is a flow configuration that has been optimized to suit a network backbone that provides rate-limited bandwidth to the system. In this case optimizing both the number of channels and the sample format can reduce bandwidth without the need to otherwise compress or modify the audio content. This also has the advantage of supporting low latency operation within a single domain.

1.3. Fault Tolerant and Scalable Media Networking

The ability to connect multiple subnets into a single media network means that the practical limit of the number of devices that can be supported in a single local area network (LAN) may be overcome. In other words, it may be possible to build very large media networks containing 1000s of devices. As discussed herein, the presence of the domain manager allows for implementation of new functionality not possible in a fully distributed network. However it also introduces a single point of failure in the media network. Therefore it is important that the media network incorporates both scalability and fault tolerant features.

System can Function without the Domain Manager

In a media network containing a domain manager configuration and monitoring information may be forwarded via the domain manager. However it is possible that the domain manager may be temporarily unavailable—e.g., due to a hardware failure or network partition. In some embodiments, it may be desirable for the media system to be fault tolerant in these circumstances and that media flows be maintained. In some embodiments, this can be facilitated by having the media devices cache sufficient configuration information to continue functioning when the domain manager is not present. In some embodiments, media devices may support maintaining media flows and clocking even if the domain manager is not present and/or being powered cycled and resuming media flows and clocking even if the domain manager is not present.

High Availability for Domain Managers

As the domain manager may be a critical part of the media network it may be desirable for the domain manager itself to be fault tolerant. Such fault tolerance can be achieved by combining multiple domain managers that share/replicate their state. As the domain manager state may be stored in a database, traditional database replication schemes can be used for this purpose. In addition, fault tolerance can be achieved by using virtual addresses for the domain manager and protocols such as Common Address Redundancy Protocol (CARP) to maintain multiple domain manager servers with failover.

Domain Manager can be Remote/"Cloud"/Connect Via Unreliable Networks

In some embodiments, the domain manager may be a set of services that is within the media network. However as the media network can be made tolerant to temporary disconnection it is possible to deliver domain manager services to media systems over the Internet using "cloud technologies" commonly used to deliver Internet services. In this case, the domain manager may include one or more of the following features:
1. The ability to monitor the media network remotely—for e.g., from a mobile phone
2. The domain manager is located remotely and may be managed by an external provider
3. A single remote multi-tenancy domain manager may manage multiple media networks belonging to several organizations.
4. The domain manager may be split into two components: one in the media network and one remote. The local component may be used to maintain some functionality while the remote service is un-available. On reconnection, the remote service can be updated with cached information Offload Device Functionality The presence of a domain manager in an media network may enable supporting additional functionality which is not be incorporated into the end devices themselves. This capability of the domain manager provides scalability and the ability to continually enhance a system as new capabilities are required.

In some embodiments, the media network may include highly constrained devices in a scalable system. In particular, a large media system may have very large numbers of input and output endpoint devices. These often only support a small number of media channels. It is possible to reduce the implementation cost of an endpoint by removing the need for the endpoint to provide native implementations of all control functions on an ongoing basis. Offloading control functionality from the endpoint to the domain manager can reduce computing resource requirements such as RAM, storage, and CPU cycles within the endpoint.

Some examples include:
1. The system employs the mDNS protocol for device and service discovery. When operating within a domain context, and endpoint is no longer required to support mDNS except when needed to maintain backward compatibility. The domain manager can take responsibility for providing appropriate records to the system on behalf of the endpoint.
2. Connection management protocols within the system are typically implemented in the endpoint to support fully distributed operation. This includes large amounts of error handling, and heuristic implementations that are designed to ensure robust, distributed operation. The domain manager can take responsibility for connection management on behalf of the endpoint. In this case the domain manager could act on behalf of the endpoint, controlling the endpoint through e.g., a simple binary protocol implementation.
3. Protocols within the system that utilize ASCII format data types are suitable for many purposes, but have the trade-off that in some cases the memory required to implement the endpoint is prohibitive for smaller implementations. In this case the domain manager may act as a format translator, and ensure that ASCII data, such as fully qualified domain names, is managed on behalf of the endpoint.

In some embodiments, the media network may include translation to other heavyweight protocols. In particular, there may be multiple protocols and standards used to control and monitor media networks. Examples include AES70, ACN, OSC, and AIMS/NMOS IS-04. Some of these are confined to particular application domains, while others are more broadly applicable. Generally, these protocols are confined to the control plane, and do not natively include media transport, instead relying on a media transport suite provided by the devices (such as Dante). Another feature of this class of protocols is that new versions, extensions, and implementations are constantly released.

The cost associated with supporting each of these protocols in all endpoints is prohibitive in terms of implementation complexity and in device resource cost. In some embodiments, the domain manager may be used to provide a translation gateway between 3rd party protocols and the native control protocols of the media device. The domain manager may provide an API that presents both a system model and an individual device model. This may be used to implement a gateway function to the 3rd party control protocol.

This may have one or more advantages over a native implementation within the device, including one or more of the following:
1. It may be more resource efficient to have the domain manager operating on a resource rich platform (relative to a small embedded endpoint implementation).
2. It may be more flexible. A protocol translation gateway can be implemented independently of the devices, can be updated easily to resolve issues, and can be scoped accordingly.
3. New protocols can be supported by the system when implemented in this manner. Individual devices do not require new firmware updates in order for the system to support a new protocol.

2. Domain Manager Description 2.1. Domain Manager Architecture

In some embodiments, the domain manager may be a software application running on a computer that is used to manage a network of media devices. The domain manager may be a set of services that operate in the control plane of the network. Protocols that have real-time requirements such as media flows or clocking protocols may not send messages via the domain manager. Thus the domain manager can be easily virtualized or implemented as a "cloud" service.

Figure 4:
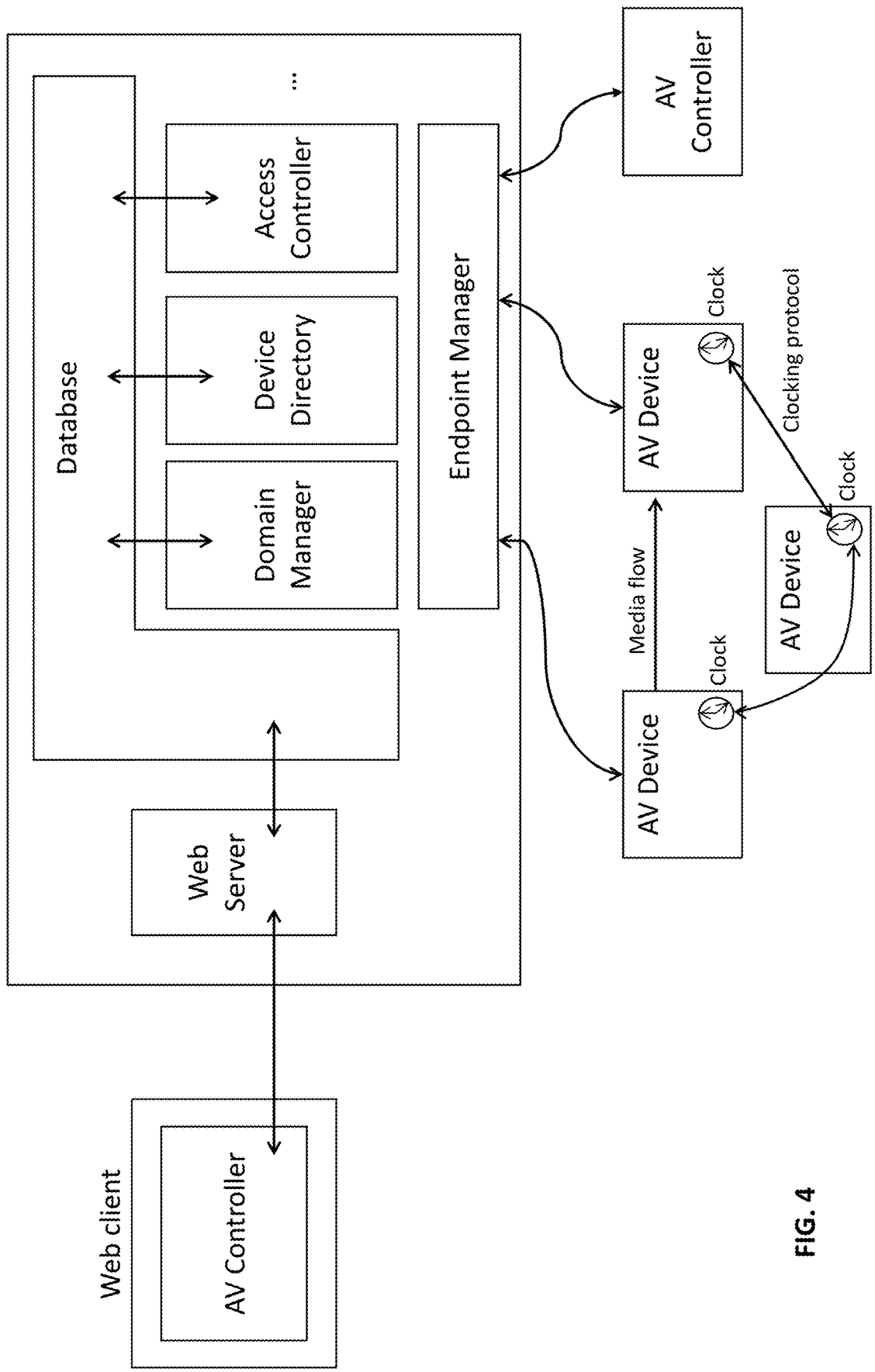
FIG. 4 is a diagram illustrating the major functional blocks of the domain manager in accordance with some embodiments described herein.

FIG. 4 is a diagram illustrating the major functional blocks of the domain manager. The database is the core of the domain manager, the other modules are able to update/query this database based on messages received and processed from devices and controllers. The endpoint manager may be responsible for setting up and maintaining secure encrypted connections to/from media devices and controllers. Example management modules are described below. Further details of the implementation of these modules are provided in context of describing the distinctive features of the domain manager. The domain manager manages the creation and deletion of domains, generation of credentials and grouping of devices into domains. The device directory is responsible for managing device registrations and lookup by devices and controllers. It may maintain a list of current connected and/or enrolled devices and may update the database to reflect this information. The device directory may track device service advertisements on behalf of the device. These advertisements may be tracked by the device directory or by a separate advertisement manager. This module could then provide advertisement information to controllers and other devices. Controllers may discover devices in a domain using this information.

The access controller is responsible for access control policy management and evaluation. Messages that pass through the DDM and are access controlled by the DDM may be processed by this block. This block may also manage access control policies for subsequent cache and evaluation on the device itself If the DDM maintains an audit trail of actions within a domain, it may be embedded within an access control manager or by using an audit log. This may include messages that are sent via the DDM and/or messages that are processed within a device, with a notification sent to the DDM.

Different pathways may exist for media controllers to communicate with the DDM. Controllers may communicate via a web server connected to the database. In this case, the controller may acquire domain and device state from the database via the web server. The database may also act as a pathway for sending device or DDM configuration from the controller to the DDM. The various DDM modules may respond to changes in the configuration areas of the database and apply the changes. Where the changes are to device configuration, a module connected to the endpoint manager may translate and/or forward the configuration instructions to the device. It may also verify that the configuration was correctly applied, and may then update the device's state within the database.

Controllers may also communicate with the DDM via the endpoint manager, network protocols to obtain device, and/or DDM state from DDM. The DDM may forward query messages from controllers to devices, with the devices sending responses back to the controller via the DDM or directly. Alternatively, the DDM may know the information being requested and can provide the device state to controllers on behalf of the devices. Controllers may also use this pathway to send configuration messages for devices. The DDM may apply access control to the configuration messages and then forward acceptable messages to the devices. It could also forward any response from the device back to the controller. Alternatively, the DDM may maintain a desired configuration for devices. In this case the DDM may process the message and update its desired configuration and send a response to the controller. It is free to apply the new configuration to the device either before or after sending a response to the controller.

The DDM may also allow passing of network messages between a controller to a device without parsing or processing the entire message. This feature allows for third-party controllers or controller plugins to push device-specific or manufacturer-specific messages between a controller and a device without the DDM having to interpret or understand the entire message. Controllers attached to web server may push the message into the database, with a module attached to the device endpoint forwarding the message to the device. Messages from a device can also be pushed into the database by the module and then obtained by the controller. Controllers attached to the endpoint may send a message to the device in the same way as for other configuration messages. The DDM may also support third-party access-control plugins to allow access control rules to be applied to these third-party messages.

The controller interface may be implemented as a software library implementing an application programming interface (API). A third party may use this library to implement a customized controller that can communicate with a DDM and media devices in a domain. Such an application programming interface could also provide methods to perform various DDM administrative functions such as managing users, viewing audit logs, etc.

Domains within a Domain Manager

Figure 5:
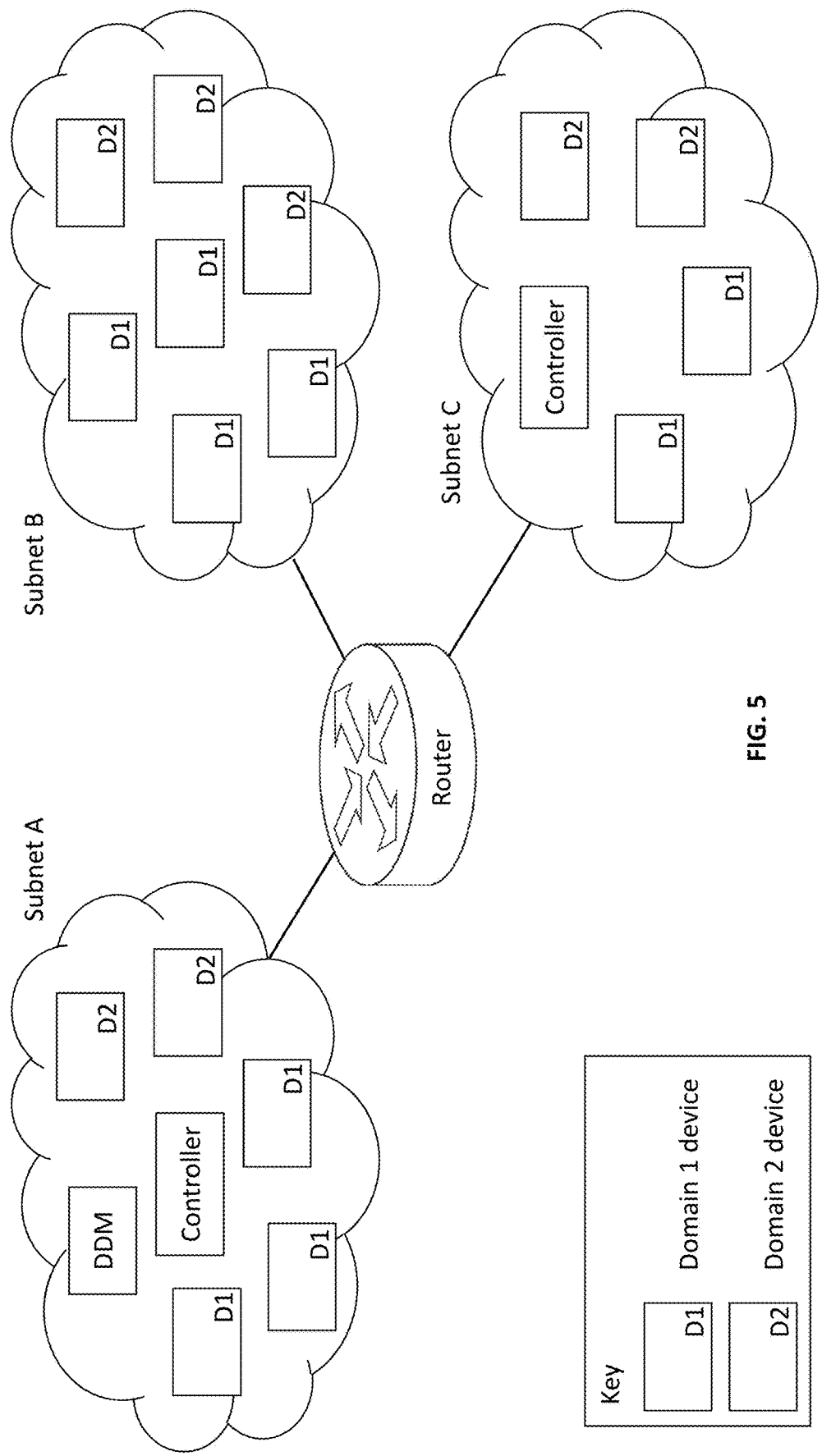
FIG. 5 illustrates an example of how devices may be partitioned into logical domains and a domain may contain devices from multiple subnets in accordance with some embodiments described herein.

A media network containing a domain manager may span multiple subnets. A domain manager in one subnet may be able to manage devices in other subnets. As illustrated in FIG. 5, devices may be partitioned into logical domains and a domain may contain devices from multiple subnets. The domain manager may be configured to manage multiple domains. As used herein, a domain may be an administrative grouping (e.g., access rights for users can be managed on a per domain basis) and/or a clock domain (e.g., devices in a domain are configured with a distinct clock domain).

2.2. Establishing a Secure Media Network

Device/Controller Bootstrapping

In a small network it may be possible to provide each device and/or controller with the address of the domain manager via manual configuration. This can done via a controller or the domain manager itself In a large network this may be impractical, in such a network a service such a DHCP may be used to provide additional configuration information. This may be implemented as follows in a network that contains a DHCP and DNS server. The DNS server may be configured with a SRV record specifying the device connection endpoint on the domain manager and the controller connection endpoint of the domain manager. Alternatively this could be an A record of the domain manager. In this case the devices and controllers assume a well-known port for the endpoint. The DHCP response may include the address of the DNS server and the search domain for the device. The device or controller performs a DNS query for the SRV record or A record of the domain manager in the search domain. Thus the device/controller has acquired the address of the domain manager and is able to initiate communication.

Generating Domain Manager/Domain/Device Credentials

Figure 6:
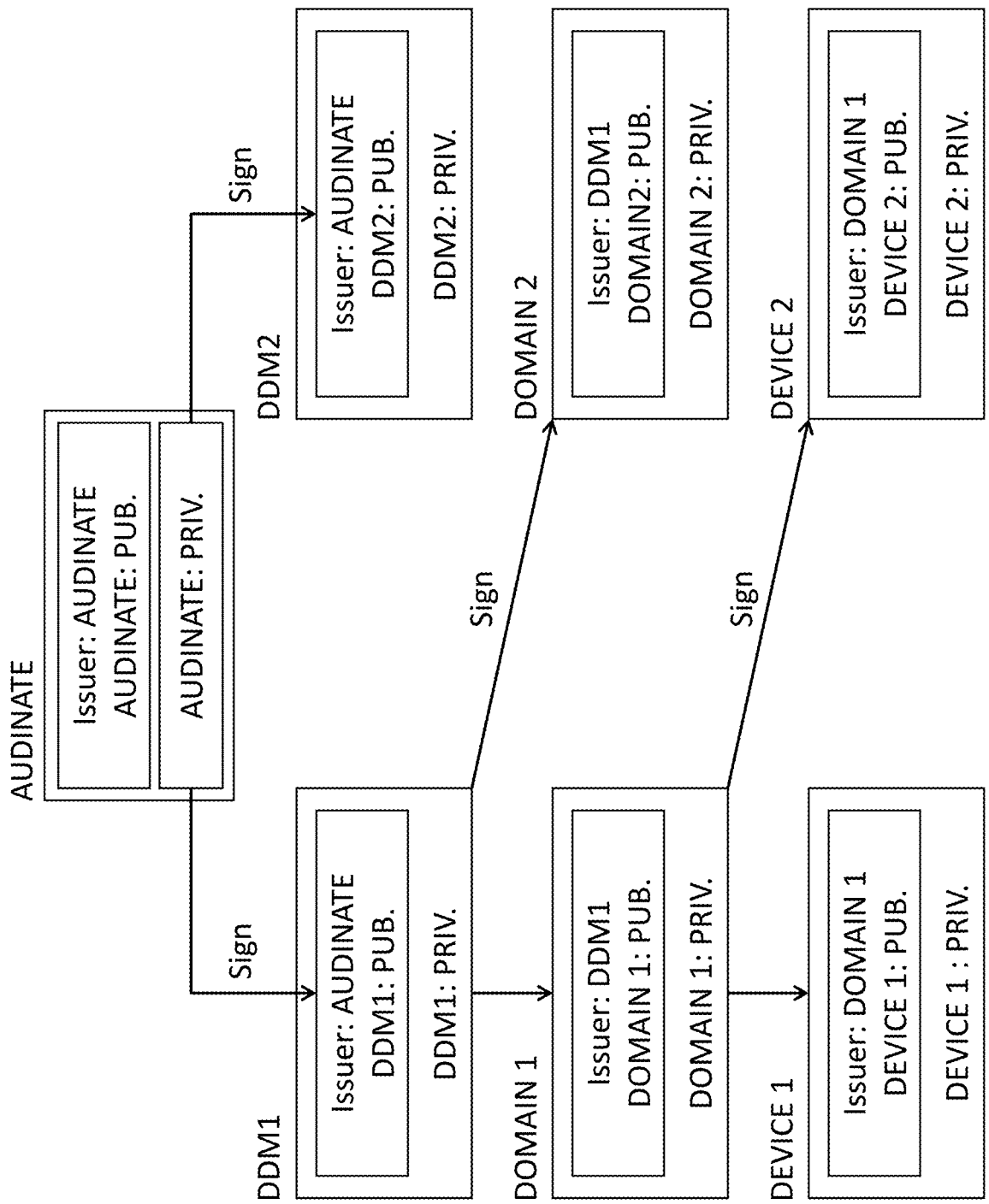
FIG. 6 is a diagram illustrating a process for signing public keys in accordance with some embodiments described herein.

In some embodiments, the domain manager may use public key infrastructure (PKI) to cryptographically authenticate entities within the media network as well as to setup secure encrypted connections. This may require each entity to be assigned private/public keys and a certificate embedding the public key signed by the entity above it in the hierarchy. This process is illustrated in FIG. 6. As illustrated, when a domain manager is installed and licensed a public/private key pair is generated and the public key is signed by e.g., the Audinate CA. When a domain manager creates a domain, a public/private key pair is generated and the public key is signed by the domain manager CA. When a device is added to a domain a public/private key pair is generated and the public key is signed by the Domain CA.

In this way a chain of trust is created and a particular device or other entity can be authenticated as being cryptographically associated with a particular Domain and domain manager.

If devices that belong to different domain managers or different domains are required to communicate, these devices can be authenticated by the exchange of certificates at the domain manager or domain level.

In FIG. 6, the Audinate entity has a private and a public key pair and a certificate containing the public key. When a DDM is first established and licensed, a private and public key pair are created for it and the public key contained in a certificate is signed by Audinate. When a Domain is created within a DDM, the DDM creates a private/public key pair for the domain and signs the certificate containing the public key with the DDM key. When a device is associated with or enrolled into a domain, a private public key pair is created for this device and the certificate containing device public key is signed with the domain key. Thus when a device connects to a DDM, the device can cryptographically authenticate itself as belonging to the domain that signed its device certificate and the domain is associated with the DDM that signed its certificate and that the DDM is a licensed Audinate product as its certificate is signed by Audinate.

Establishing Encrypted Connections from Devices and Controllers

In some embodiments, devices and/or controllers may need to be assigned public/private key pairs so that individual entities can be authenticated. This may require a bootstrapping step where the keys need to be securely installed on the device. This can be done by using an encrypted connection setup with a common device key. After the per device keys are installed the connection can be re-established using per device keys.

In some embodiments, connections from media controllers may be authenticated via credentials of the user associated with it. In such a case the connection may be encrypted by using a technology such as SSL.

2.3. Device directory

Figure 7:
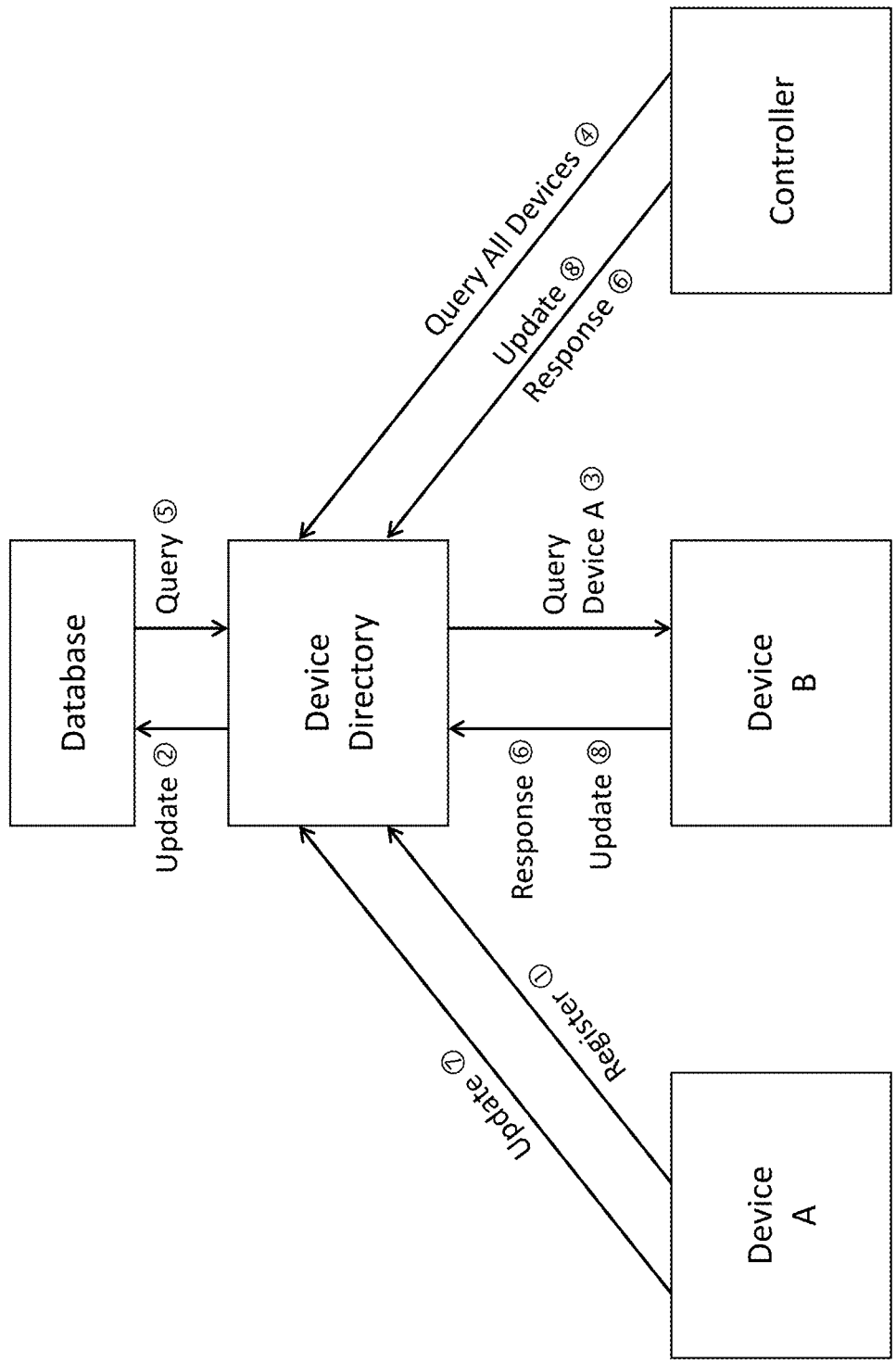
FIG. 7 is a diagram illustrating how a device directory module manages the discovery of device information by other devices and controllers in accordance with some embodiments described herein.

In some embodiments, the device directory module manages the discovery of device information by other devices and controllers. The sequence of interaction is illustrated in FIG. 7 and may be as follows:

1. When a device (device A) is powered on it registers its device information or metadata by sending one or more messages to the domain manager. These messages contain descriptive information about the device: e.g., network interface information such as IP address, media information such as number of channels, channel labels, sample rates, supported encoding types; and/or product information such as versions, manufacturer, model, supported capabilities etc.
2. The domain manager device directory module processes these messages and stores the device information in the database.
3. Another device (device B) that wishes to configure a media flow from A, issues a query for relevant information such as address and channel information so it can request a flow from device A. This query is "long lived," so the device directory maintains a record of this query.
4. A controller displays information about media devices to a user such that that user can monitor and configure the viewed devices. In order to do so a controller issues a query for multiple devices. This query is "long lived," so the device directory maintains a record of this query. The query may return information about all the devices in a network. Alternatively, in a large network the query may be structured to return only a subset of the devices by defining a query that matches specific device attributes such as a specified subnet, a specified sample rate or combinations thereof.
5. The device directory queries the database.
6. The device directory prepares responses to Device B and the controller.
7. If the configuration or properties of device A changes it sends messages to the domain manager to update the information in the database.
8. On reception of an update from device A, the domain manager updates the database and any devices or controllers that have a "long lived" query on the updated attributes of device A.

9. If a device is unexpectedly disconnected from the network, the connection on the domain manager will timeout and the interested devices and controllers will be updated.

In the description above the device registering its information and the device and/or controller querying this information may be on different subnets.

In the description above devices and controllers may be connected via TCP or UDP connections and the domain manager updates a "long lived" query by sending update messages to the relevant devices and controllers. In an alternative implementation controllers may be web applications and the information in the controller may be updated by real time notifications of changes to the database. An example of such an implementation could be a meteor web application using the domain manager protocol to update the web client information (REF).

2.4. Clock Management

In some embodiments, domains (e.g., Dante domains) may span multiple IP subnets. Devices within a domain may require synchronized clocks. Multicast PTP can be used to distribute clock synchronization information to devices within a subnet. However multicast PTP may not be used across subnets unless routers are explicitly configured to forward multicast. Thus unicast PTP may be used to distribute clock synchronization information between subnets. Devices capable of both unicast and multicast PTP may act as boundary clocks between an inter-subnet unicast clock domain and intra-subnet multicast clock domains. The unicast master may be the device that has its PTP unicast port in the master state. The unicast master may also be the grandmaster for the domain consisting of all the devices in multiple subnets. The unicast master may be selected by using a standard PTP best master clock (BMC) procedure.

When a device registers with the domain manager it sends its clocking capabilities to the domain manager including whether it supports unicast clocking. The domain manager maintains a list of unicast clocking capable devices for each subnet. At least one unicast capable device in each subnet should be selected to be part of the PTP unicast group. These devices have their unicast clocking port enabled. More than one device may be selected so that an alternate device is available if the first device is disconnected. This selection may be done manually by a user, or alternatively the domain manager can auto-select the best/desired unicast devices.

In order to exchange unicast PTP clocking messages each device in the unicast group may be configured with the IP addresses of the other devices in the group. The domain manager maintains a list of IP addresses of the devices in the unicast PTP group. When a device is added to the unicast group the domain manager add its IP address to the set of addresses and updates all devices in the unicast group. When a device is removed from the unicast group or removed from the domain the domain manager removes the address from its list and updates all the other devices in the group.

As discussed above, the domain manager does not participate in the clocking protocol itself, the devices in the unicast group maintain clocking across the domain by exchanging clocking message between themselves. The domain manager in only responsible for enabling or disabling the unicast port on a device; propagating the addresses of participating unicast devices when a device's unicast port is enabled/disabled or when a participating unicast device is removed from the domain; and/or notifying the user on clocking mis-configuration

Auto Configuration

In some embodiments, it may be possible for a user to manually select unicast clocking devices from the list of unicast capable devices. The domain manager may also provide the option of auto-configuration of unicast clocking. This option may be useful when a user has limited understanding of unicast clocking, and to avoid potential mis-configuration by the user when manually configuring clocking. Using the auto configuration option, the domain manager will enable unicast clocking on a subset of devices in each subnet. For example this could be two devices so there is a unicast device and an alternate in each subnet. The auto configuration option may choose the best devices (in each subnet). In some embodiments, these devices may be selected by comparing the clocking capabilities of candidate devices. The capabilities can include information such as the stability of the local clock on the device.

The domain manager may also be able to detect mis-configuration of unicast clocking and can inform the user when this situation occurs. Mis-configuration can arise due to a subnet not having a unicast clock configured or unicast-enabled devices being disconnected or removed from domain subnet. These warnings may include:

No device has unicast clocking enabled and there are devices in two or more subnets.

A subnet has no unicast clocking capable device when there are more than one subnets.

Only one device has unicast clocking enabled in a subnet when another device with unicast clocking capability exists (in the subnet).

Two devices in a subnet have unicast clocking enabled in a subnet but there is a third device with unicast clocking capability and has better clocking capabilities.

Minimizing Unicast Clocking Communication

When unicast clocking is used to distribute clocking information access subnets, the designated unicast master may need to send clock synchronization information to the other unicast peers in the unicast group. Clock synchronization messages are relatively high rate (e.g., several messages a second). If for example each subnet has an alternate unicast device then the number of devices the unicast master needs to send to is doubled. As there may be a limit on how many unicast PTP connections can be supported by a device, the total number of subnets that can be supported in this network is halved. The volume of unicast traffic between subnets is also doubled. Thus to support a large number of subnets, it may be desirable that the unicast PTP master only sends PTP clock synchronization messages to the best unicast device in each of the other subnets, and the alternate unicast devices are maintained in an "idle" unicast state, with minimal unicast traffic to/from the device. The alternate devices can maintain clock synchronization via the local multicast master.

Devices enter the "idle unicast" state by comparing the clock quality of other masters in the local subnet via the multicast port. When a device determines that another device is a better source of clock sync information, it puts its unicast port into the idle state.

Such an optimized PTP network can be implemented by using PTP v2 for unicast clocking. In PTP v2, there are separate messages for grandmaster information (low-rate)

and timing information (high-rate). When a unicast port enters the idle state, it stops sending PTP timing requests messages to the unicast master. Instead it starts sending a low rate periodic custom "keepalive" message to the unicast master. In the absence of PTP timing request messages from a participating device the unicast master will stop sending timing information messages to that device. The receipt of the custom keep alive message at the unicast master indicates that the device is only interested in low-rate PTP grandmaster information messages. The unicast master uses timeouts to determine the absence of a device when it is not receiving timing requests or custom keep alive messages from a device. If a timeout is observed the master can stop sending any unicast messages to that device. This reduces unicast traffic when a device goes away. If the grandmaster information in the grandmaster message changes or if another device becomes unicast master, all idle unicast ports re-activated.

Figure 8:
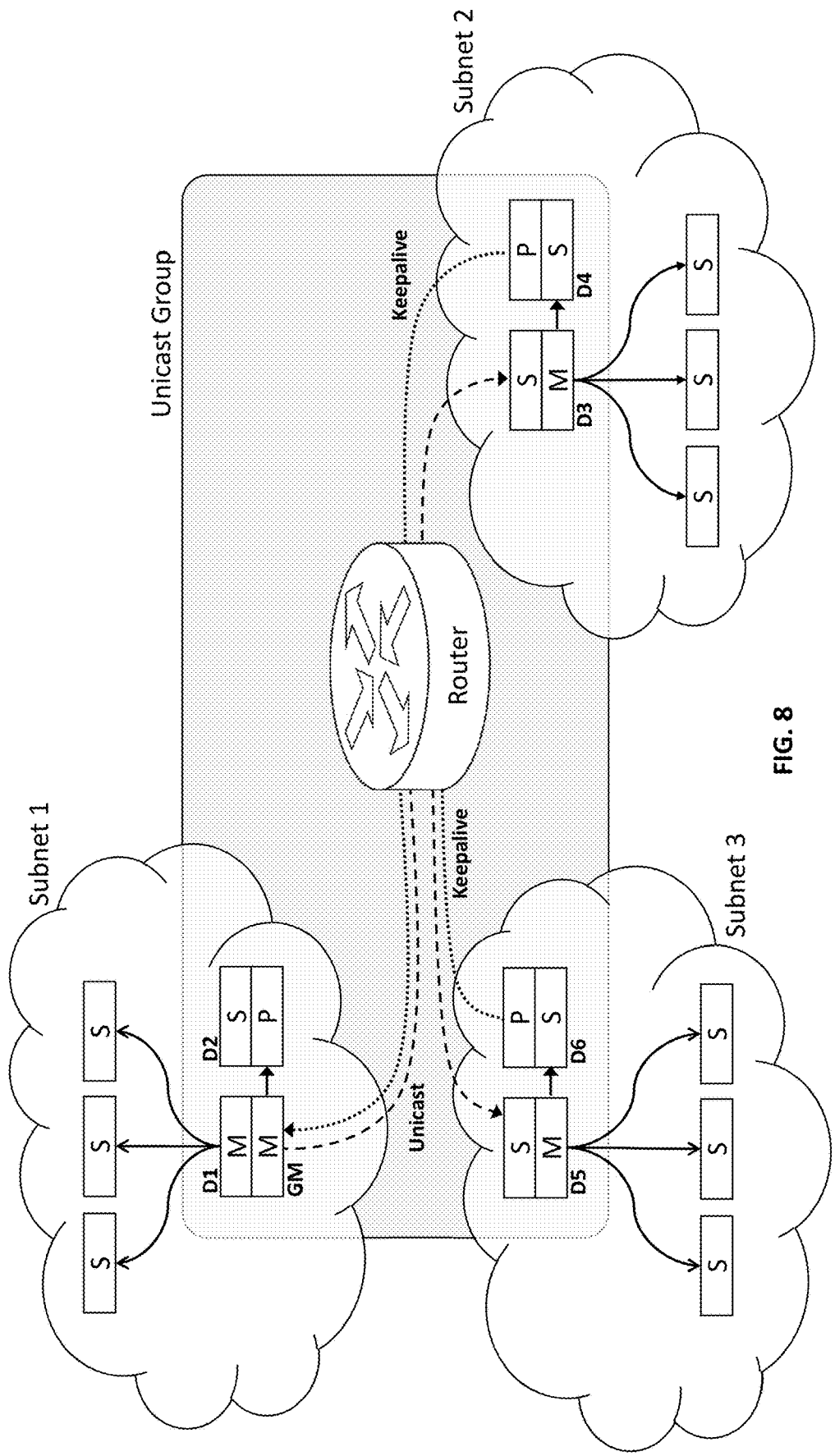
FIG. 8 is a diagram illustrating active/idle states for devices in a unicast operation in accordance with some embodiments described herein.

Such a network is illustrated in FIG. 8. In this network there are three subnets, each with two devices with unicast clocking enabled. D1 is the unicast master as it has a better clock than all other devices. D3 and D5 are unicast slaves as they have better clocks that D4 and D6 respectively. D1, D3 and D5 are multicast masters within their own subnets and provide clock information to all devices within their own subnets via multicast. D2, D4 and D6 maintain their unicast ports in idle state, they are synchronized to the network via multicast. D1 sends low-rate grandmaster information to all devices in the unicast group. D1 only exchanges timing messages via unicast with D3 and D5. D2, D4 and D6 send low-rate keepalive messages to D1. Thus, the connections between D1 and D2, D4 and D6 and maintained using only low-rate messages.

Quick Start of a Participating Device

When a device is the unicast group is reconnected to the network, it may first send a keep alive message to each device in its list of participating devices. On reception of such a message, the current master will start sending Unicast PTP synchronization messages to that device. This way the recently connected device can immediately become a slave device instead of transitioning through a PTP master state where it sends unicast PTP synchronizations messages to the other devices in the unicast group.

Absence of Domain Manager

Unicast clocking can continue to work if a domain manager goes away as each participating unicast device persists the list of addresses of the peers, including across reboot.

2.5. Multicast Flows

Multicast Address Management

In some embodiments, multicast flows created in a media network may be sent to receivers within the same subnet or to receivers in multiple subnets. In the latter case intervening routers may be configured to forward multicast. The domain manager is used as a centralized allocator of multicast addresses. Addresses may be requested by transmitting media devices or by media controllers which then configure the media devices with appropriate flow parameters and the multicast address to be used.

Multicast/Unicast Translation

Figure 9:
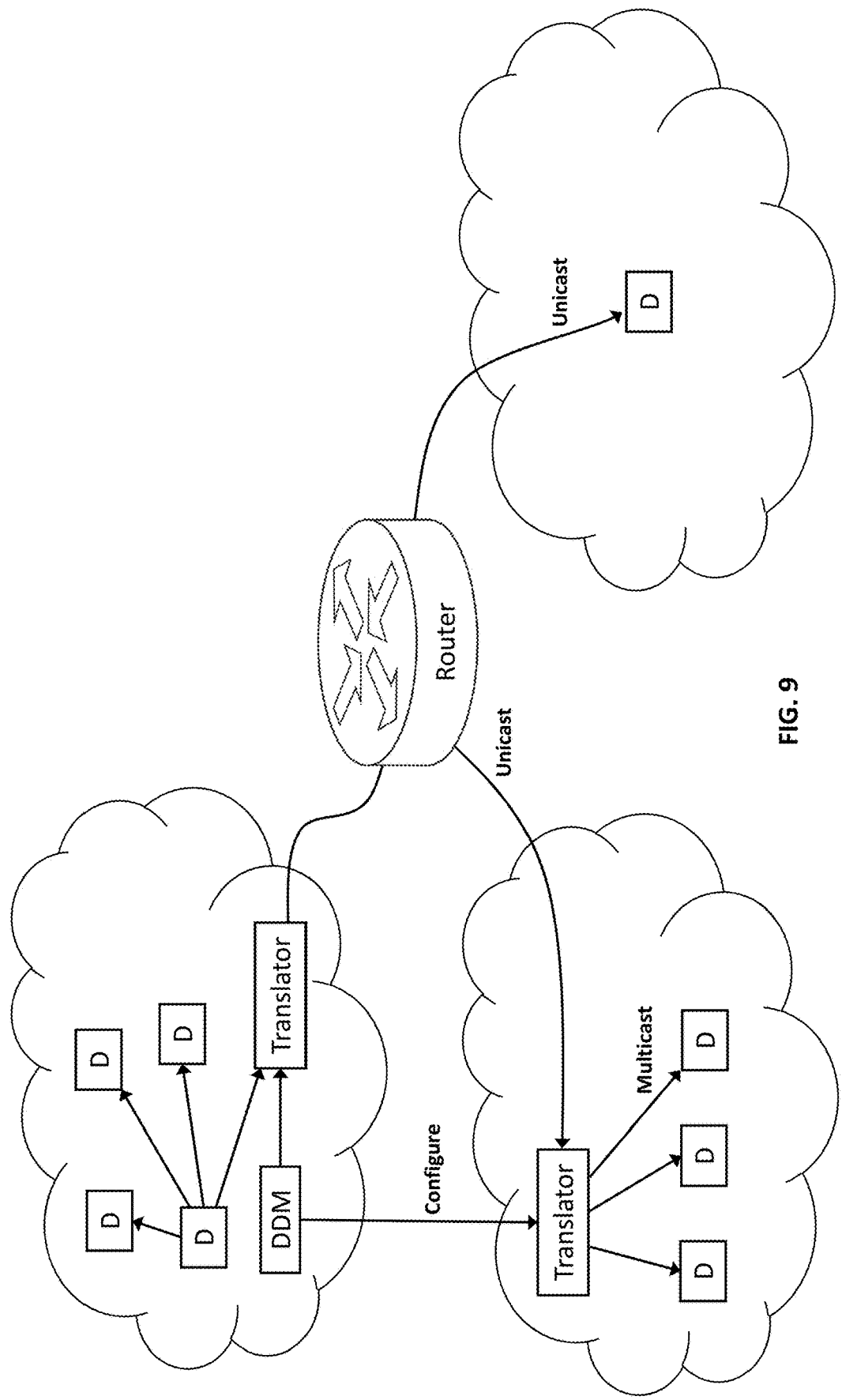
FIG. 9 is an example of how unicast/multicast translators may be configured and managed by the domain manager in accordance with some embodiments described herein.

In certain instances if there are many multicast receivers in the originating subnet and a few receivers in a remote subnet it may be more efficient to transmit the flow to the remote subnet as a unicast flow. In other cases where multicast routing is not configured it may be more efficient to translate the unicast flow back to multicast in the remote subnet. This is implemented by means of a unicast/multicast translator. This translator may be a specialized implementation of e.g., a Dante Virtual Soundcard or Dante Via. As illustrated in FIG. 9, these translators may be configured and managed by the domain manager. In some embodiments, multiple translators may exist one in each subnet. FIG. 9 shows a device sending audio via multicast, with receiving devices in its local subnet and in two remote subnets. Devices in the local subnet simply receive the audio via multicast. A multicast-unicast translator in the transmitting device's subnet receives the multicast audio and sends via two unicast to two receivers. One of the receivers is a device receiving the audio directly via unicast. The second receiver is a translator in a remote subnet that receives the unicast audio and re-transmits it locally via multicast to receivers within its own subnet. Both translators are configured by the DDM.

2.6. Access Control and Audit Logs

In order to secure a media network configuration messages issued by controllers may need to be access controlled to prevent un-authorized changes. In addition any changes made should be logged in an audit trail for accountability and diagnostic purposes.

Figure 10:
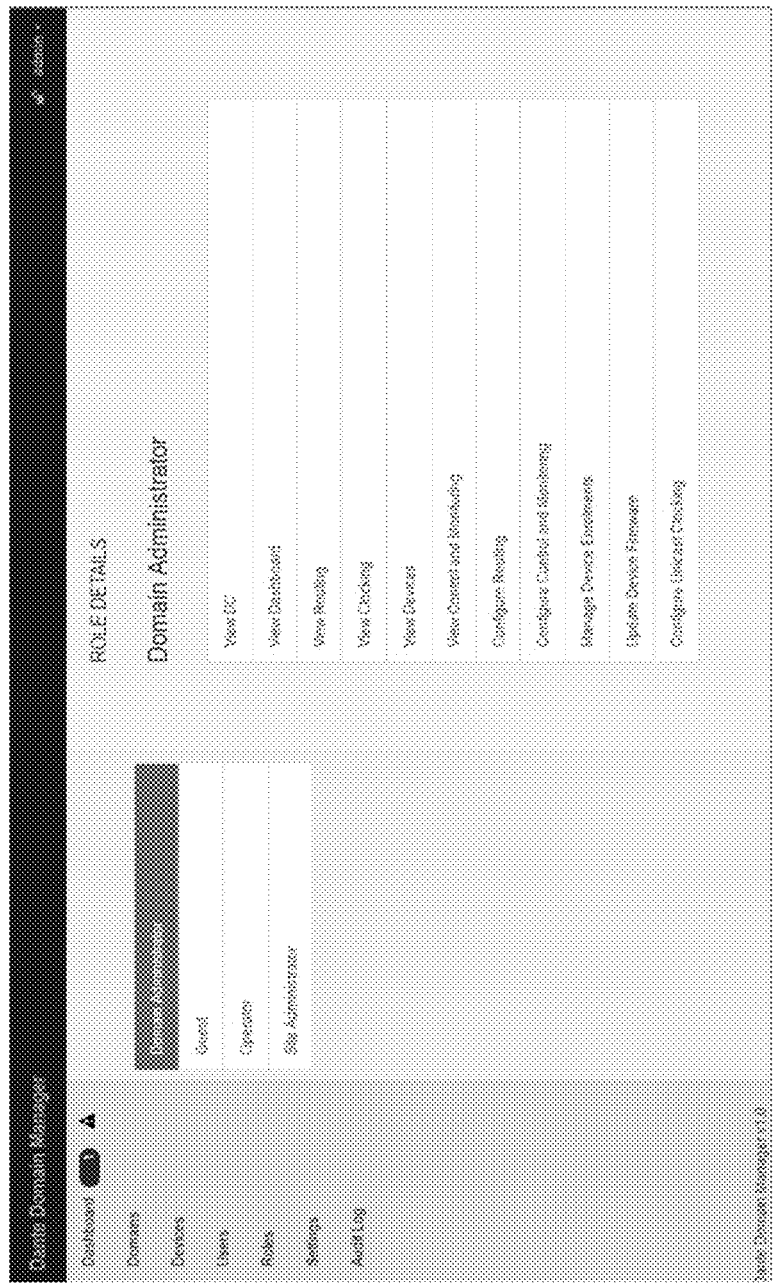
FIG. 10 is a screenshot illustrating an example set of permissions assigned to a site administrator of a Dante network in accordance with some embodiments described herein.

In some embodiments, the domain manager may be configured to allow an administrator to define and maintain a database of access control policies. Different users issuing configuration commands via media controllers may be assigned different permissions. For simplicity users may be assigned roles and permissions may be assigned to each role. FIG. 10 is a screenshot illustrating an example set of permissions assigned to a site administrator of a Dante network.

Figure 11:
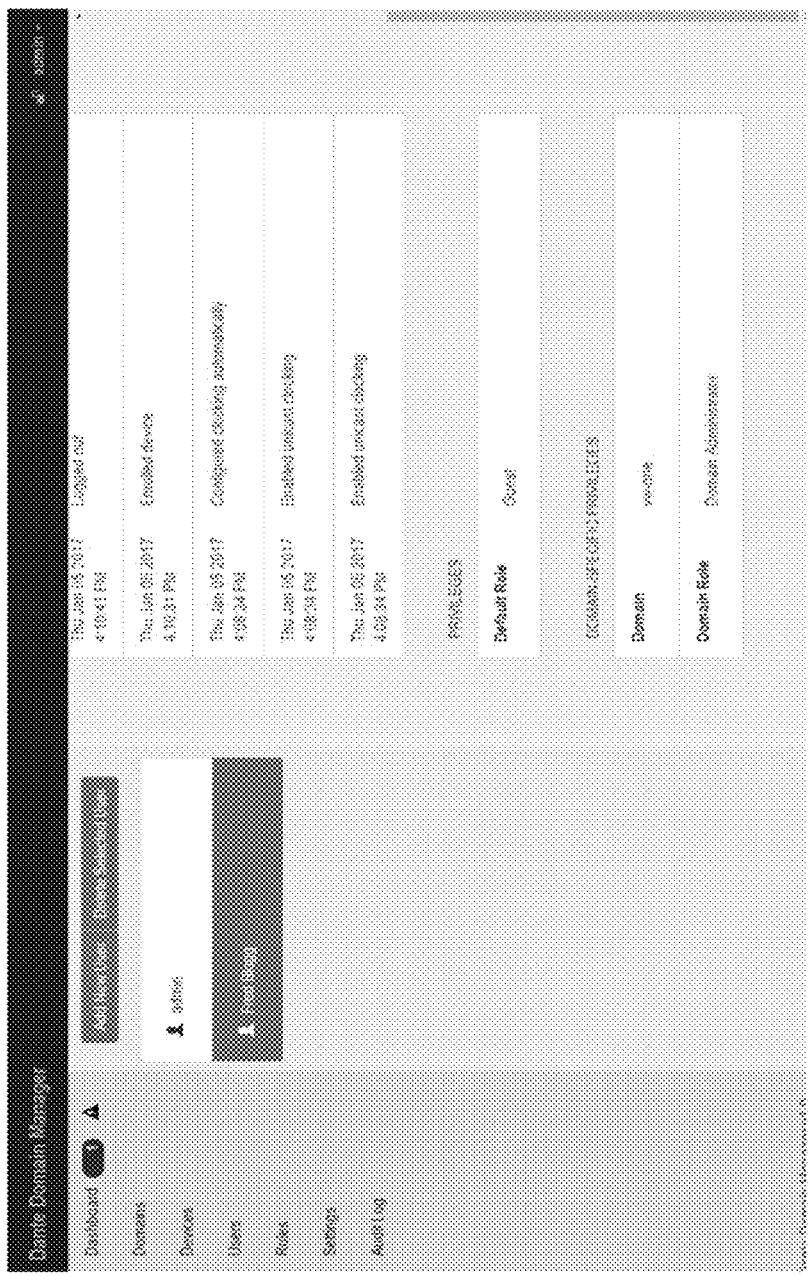
FIG. 11 illustrates how different roles may apply to different domains or groups of devices in accordance with some embodiments described herein.

Other roles may be assigned lesser permissions. FIG. 11 illustrates the roles assigned for user "Fred Blogg", different roles may apply to different domains or groups of devices.

Figure 12:
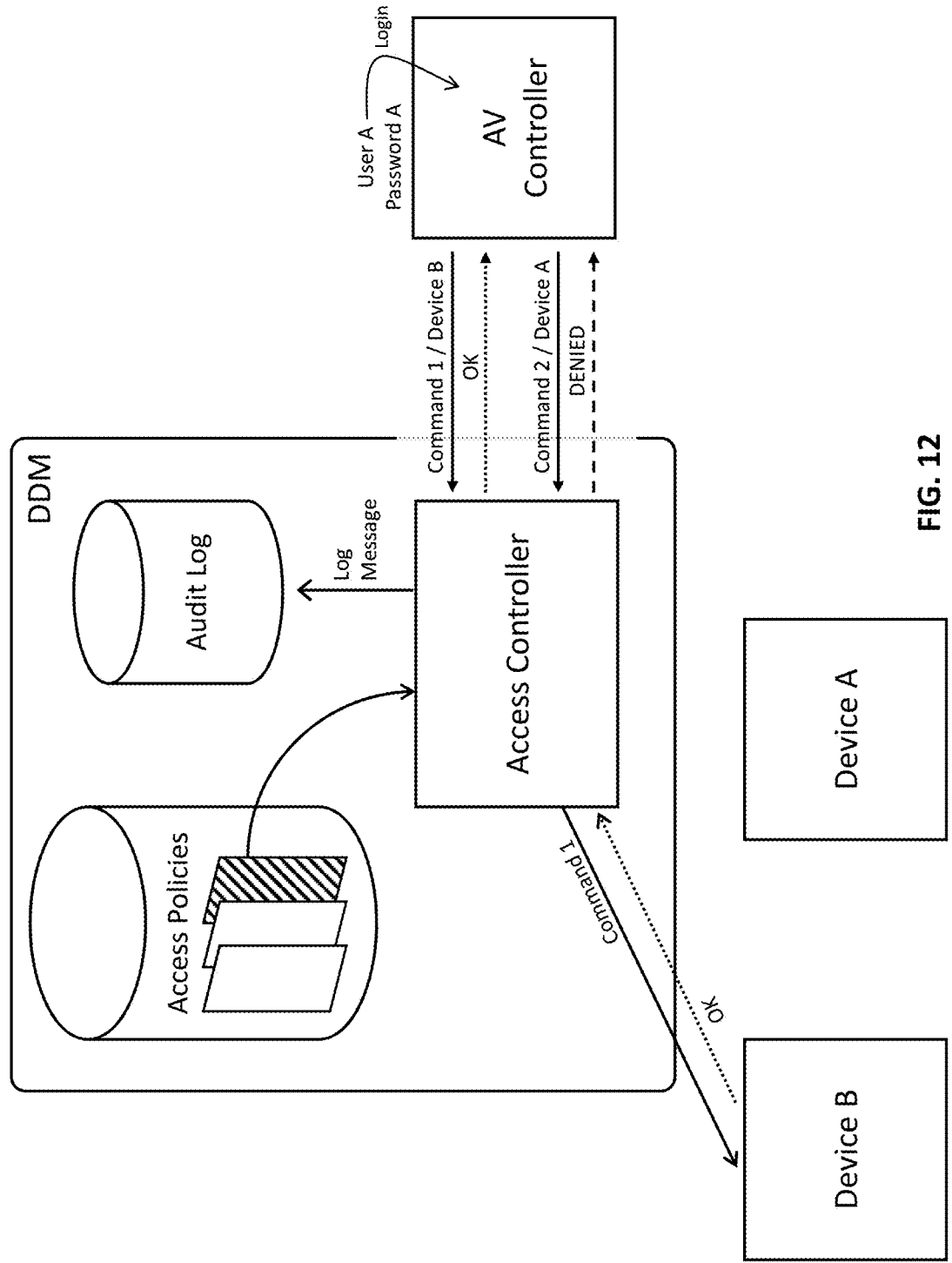
FIG. 12 illustrates a user configuring devices in a media network via a controller in accordance with some embodiments described herein.

So that complex access control policies can be evaluated without overloading a lightweight media device, configuration commands issued by an media controller may be forwarded via the domain manager to the target device. FIG. 12 illustrates a user configuring devices in a media network via a controller.

Figure 13:
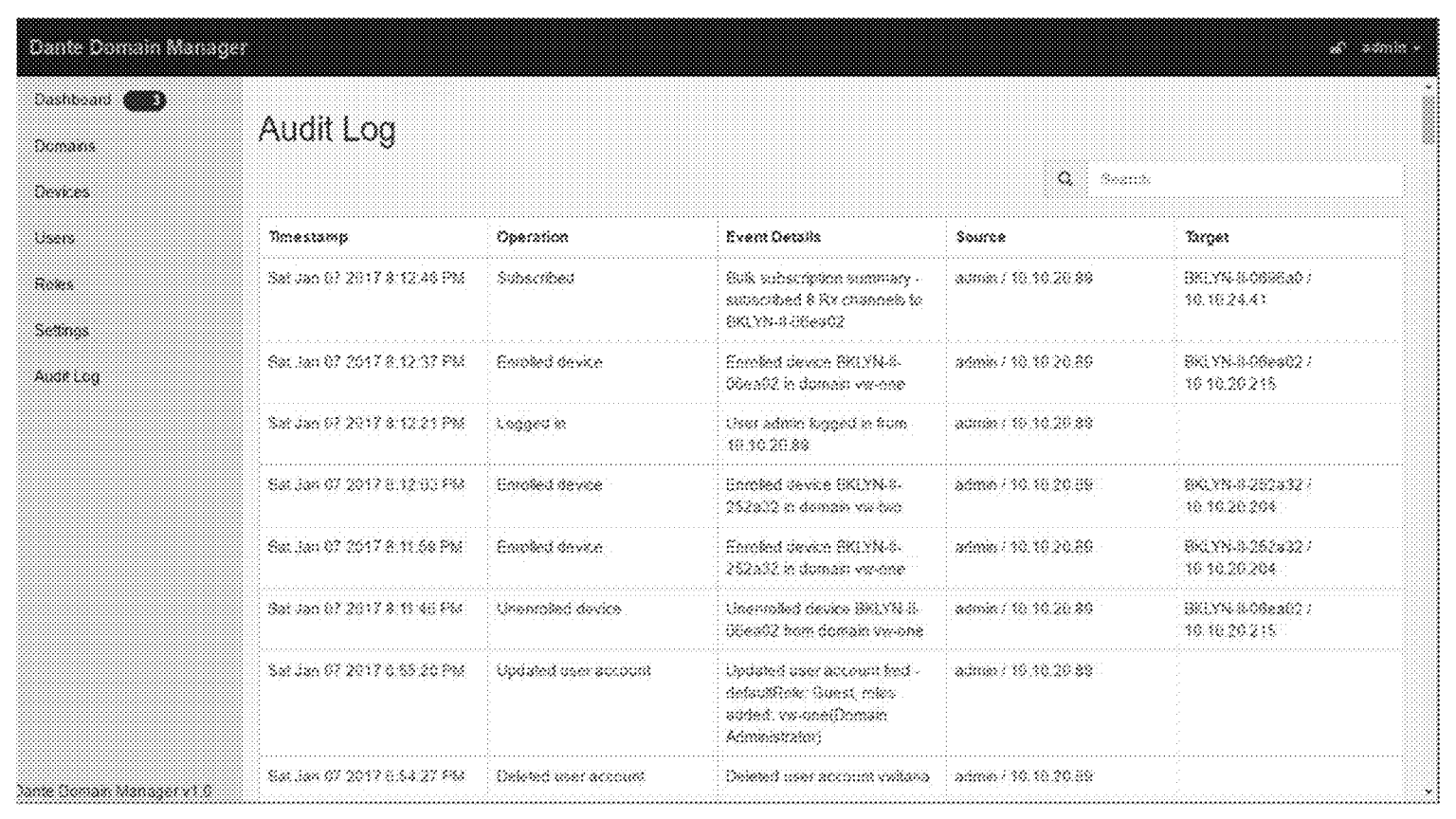

As illustrated in FIG. 12, a user connects to the domain manager via a media controller by providing appropriate security credentials. Based on the role assigned to this user an appropriate access control policy is associated with this session. A configuration message issued by the controller is evaluated against this policy which may require partial parsing of the message (e.g., to identify its opcode). If the user has permission to execute the operation on the target device, then it is forwarded to the device, otherwise an access denied error may be returned to controller. Audit information such as the originating user identity, controller IP address, timestamp, target device, and/or configuration command and attributes may be extracted from the message stored in the audit log at the domain manager. An example audit log is shown in FIG. 13.

Figure 14:
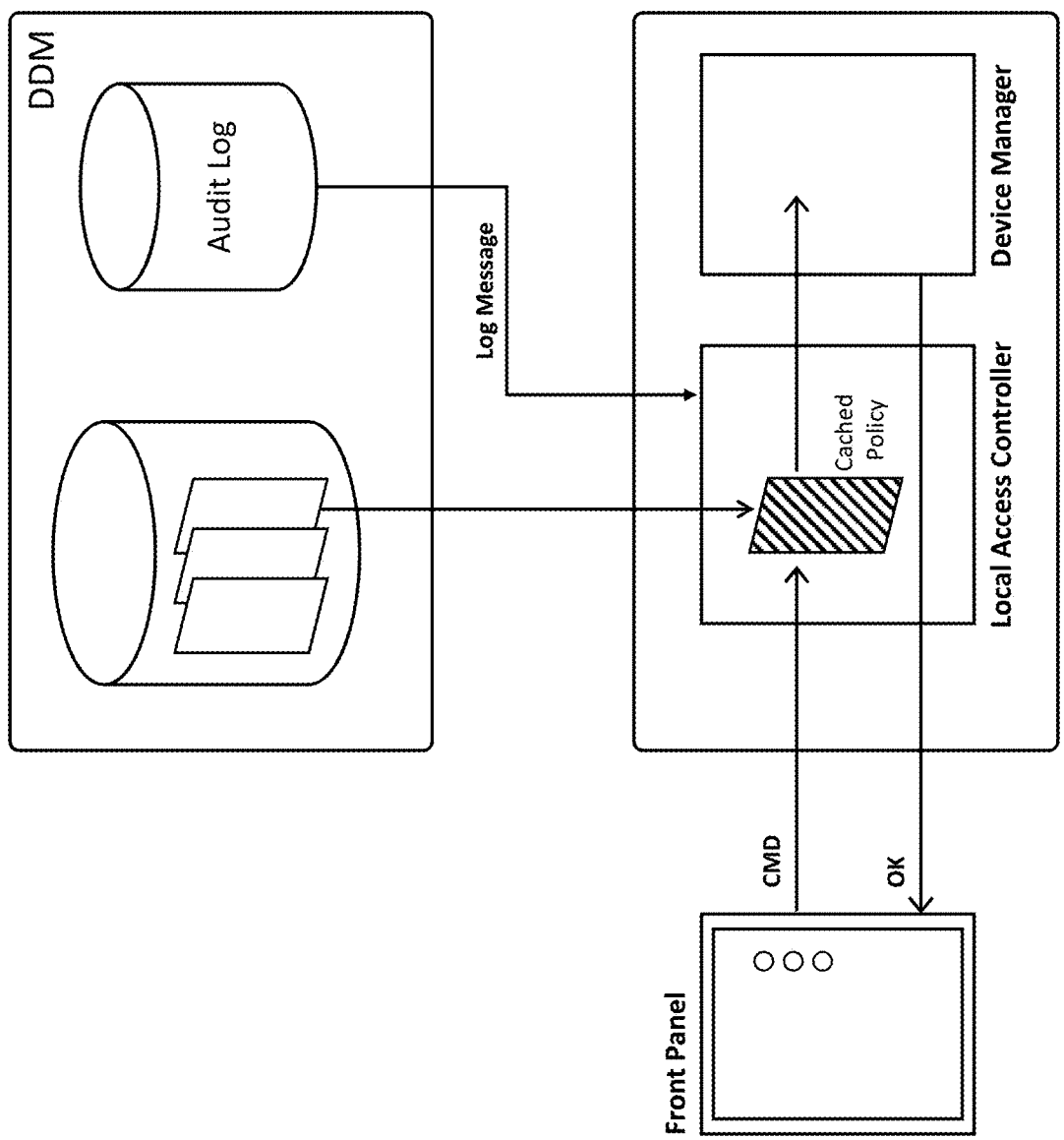
FIG. 14 illustrates how media device may be configured from within the device itself e.g., via a front panel in accordance with some embodiments described herein.

It is also possible for access control policies to be defined and managed on the domain manager but cached and evaluated on the device itself, without requiring the configuration message to be forwarded via the domain manager. This can be useful when processing messages that originate from within the device rather than an external controller. This is illustrated in FIG. 14. In this example, a media device includes a front panel with buttons that generate local control messages when pressed. The domain manager sends the device the access control policy to be used for local messages. When a configuration message is generated by the front control panel, it is evaluated against the device's cached access control policy and accepted or rejected on that basis. If a message is accepted, it is processed by the device, possibly with an acknowledgement sent back to the front panel. The local access control policy engine notifies the DDM about accepted messages for the purposes of audit logging the local control message.

2.7. Statistics and Health Monitoring

In some embodiments, media devices may generate diagnostic data, such as events generated on error conditions (e.g., the device local clock lost synchronization, media packet errors, etc.) or periodic statistics (e.g., local lock variation over time, latency of received media packets). This information may be sent to the domain manager by devices when the event occurs or periodically for statistical data. The domain manager may also generate events when a device state change is observed (e.g. a device becomes uncontactable).

Device data sent to the domain manager may be formatted in different ways. The domain manager may post-process the data if needed to generate summaries or other more user-friendly representations. The data may be stored in the domain manager database, and provide various outputs. For example:

- Data may be displayed in a dashboard within an media controller. This information could be in the form of alerts or traffic light indicators indicating status of media devices.
- Statistics data may be displayed in the form of graphs or histograms within a media controller.
- Searchable log of events may be stored.

In some embodiments, raw information can be aggregated so that long term historical data can be maintained. Specialized databases that are optimized to handle time series data could be used for this purpose.

The data collected in the database may be sent to third party network management tools. For example the administrator of the media network may be monitoring other aspects of the network using a network management tool. Such software may be using a protocol such as Simple Network Management Protocol (SNMP) to receive events from devices. In such a case the domain manager can act as a proxy on behalf of all the media devices and can generate SNMP traps (events) that can alert the administrator using the network management software of issues with the media devices.

2.8. Firmware Management

In some embodiments, the domain manager may incorporate firmware management for media devices on the network. This may include any combination of one or more of the following functionalities:

- Identification of available updates—This may performed by matching the current firmware version information for the media device against a database of available updates. This database may be internal or external to the domain manager and the domain manager may check for updates on a periodic basis and notify the administrator of availability of updates. The domain manager may alter the administrator if such an update creates any incompatibility with other media devices already in the network.
- Upgrading devices—A user with appropriate authorization may be able to update the firmware of devices. The domain manager may download the appropriate firmware and update the selected devices over the connection (e.g., a secure connection) to each device. The user may schedule this update to occur at a scheduled time.
- Rollback of devices—If the new firmware does not function correctly the option should be available to rollback the firmware on the media device to the original version. This old version may also be available and downloadable from the database, alternatively it can be extracted from the device and stored on the domain manager before the update is performed.

2.9. Limited Interoperability with Non-Domain-Aware Devices

In order to participate in a media network containing a domain manager, media devices may need updated firmware so that they can locate and securely connect to the domain manager. In some embodiments, there may be reasons that such firmware is unavailable for certain media devices. In such cases it may be useful for such media devices to be able to be incorporated into the media network and able to send/receive media flows from devices within a domain (e.g., a Dante domain). However these devices do not have the full functionality of devices in the domain e.g., control communication from a controller may not be secure, it may not be possible to send/receive media flows to devices in another subnet, there may not be an audit log of configuration changes, etc.

Allowing the exchange of media flows between enrolled domain aware and non-domain-aware media devices may include any combination of one or more of the following capabilities:

1. The non-domain-aware device's clock domain may be set to be the same as the domain of the devices it is exchanging media flows with. Alternatively, all the devices can be configured to be in the "default" domain but with loss of clocking isolation.

2. When transmitting from a device in a domain to a non-domain-aware device, the transmitting media device may be configured to include a white list of non-domain-aware devices and source channels.

Figure 15:
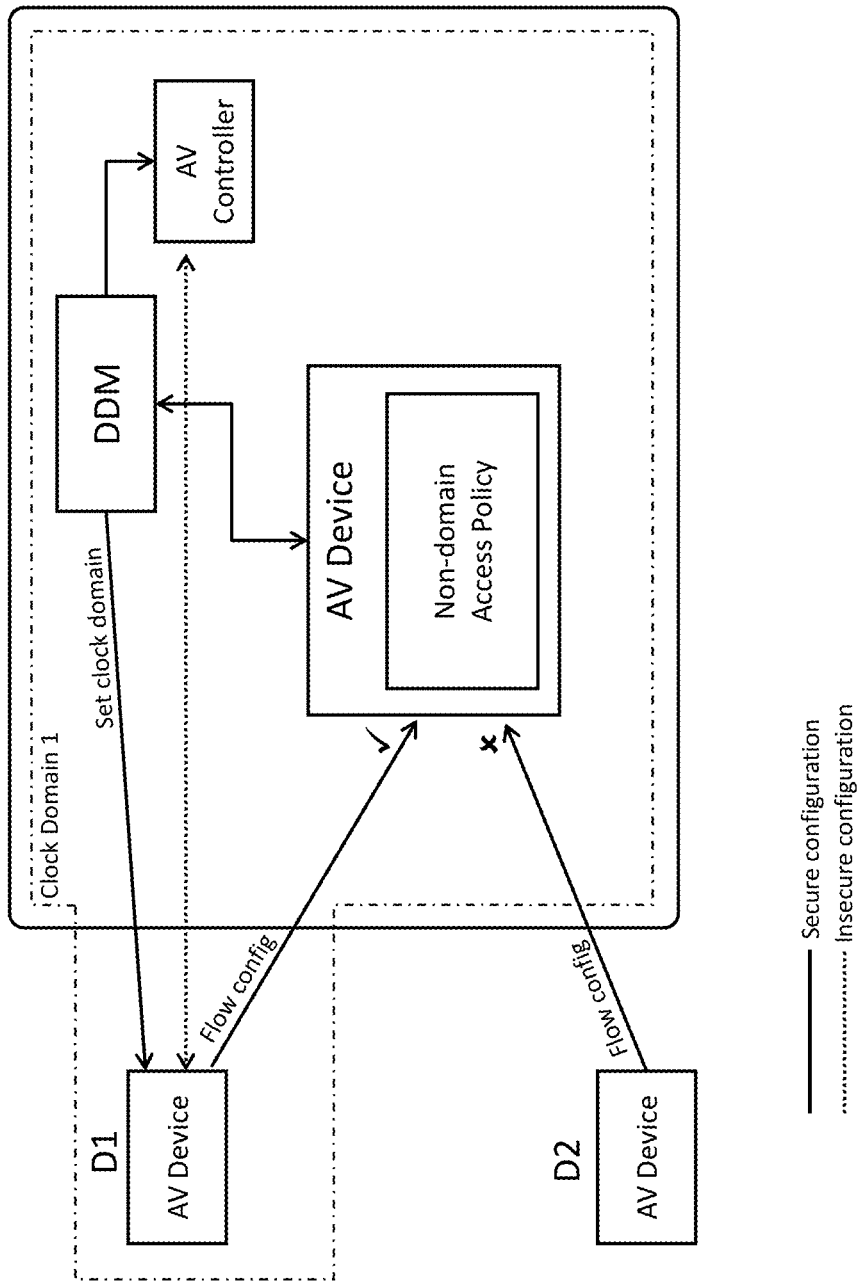
FIG. 15 is an example of a system including domain-aware and non-domain-aware devices with a domain manager in accordance with some embodiments described herein.

FIG. 15 shows a non-domain-aware device (D1) interoperating with devices in a managed domain. The DDM configures the non-domain-aware device's clock domain to match the Dante domain's clock domain using an insecure connection. The DDM uses a secure connection to configure the media device in the domain to allow flow configuration from the non-domain-aware device. The media controller is part of the managed domain, and uses a secure connection to discover and manage devices in the domain. The media controller can also use insecure connections to discover and manage non-domain-aware devices. The media controller configures the non-domain-aware devices to receive audio from the device in the domain. This operation is accepted by the device in the domain. The other non-domain-aware device (D2) has not been configured to interoperate with the domain. Flow configuration requests from this device are rejected by the device in the domain as it has not been configured to accept them.

2.10. Fault Tolerance

In some existing networks (e.g., a Dante network) that are limited to a single subnet, control and monitoring may be distributed and thus there is no single point of failure. The domain manager allows such networks to be enhanced with many additional features however it does introduce a possible single point of failure. Therefore it is desirable that the media devices can continue to send and receive media flows with accurate clocking even if the domain manager is temporarily unavailable. The media network should be able to recover and restart media flows even if media devices are restarted while the domain manager and other services are not available.

Operation While the Domain Manager and Other Infrastructure is Temporarily Unavailable In some embodiments, to maintain availability, media devices cache some or all of the following information:
1. IP address lease information—this may permit the media device to operate with the last assigned DHCP address even if the DHCP server is temporarily unavailable.
2. IP address for the domain manager—this may permit the media devices and controller to connect to the domain manger even if DHCP/DNS services are temporarily unavailable.
3. IP addresses and media flow configuration information for peer devices—this may allow media flows to be restarted without the domain manager being present. However it may not be possible to reconfigure flows without the domain manager.
4. Maintenance of clocking including across multiple subnets—See section on clocking.

High Availability Domain Manager

In media networks where is it critical to always maintain control and monitoring functionality a cluster of domain managers may be installed to maintain "high availability". In such a network the domain managers may be configured with the IP addresses or hostname of their peers. A virtual IP address and optionally a virtual hostname that is shared amongst the peers may also be configured. A virtual address management protocol such as Common Address Allocation Protocol (CARP) or Virtual Router Redundancy Protocol (VRRP) or a database cluster management protocol may be used to determine which domain manager is the master at a given time. The peer domain managers may also use a database replication protocol to replicate the database state from the master to the slaves may manage the ownership of the virtual IP address. The domain manager that is the master owns the virtual IP address and the other domain managers may be maintained as slaves. The media devices and controllers connect to the virtual IP address and thus connect to the current master. If the virtual address management protocol or database cluster management protocol detects that the master is disconnected then another domain manager will take over its role as well as the virtual IP address. The media devices and controllers will now connect to this new master. As the database state has been replicated to the slaves, the media devices and controllers will be able to continue operation without loss of data.

Figure 16:
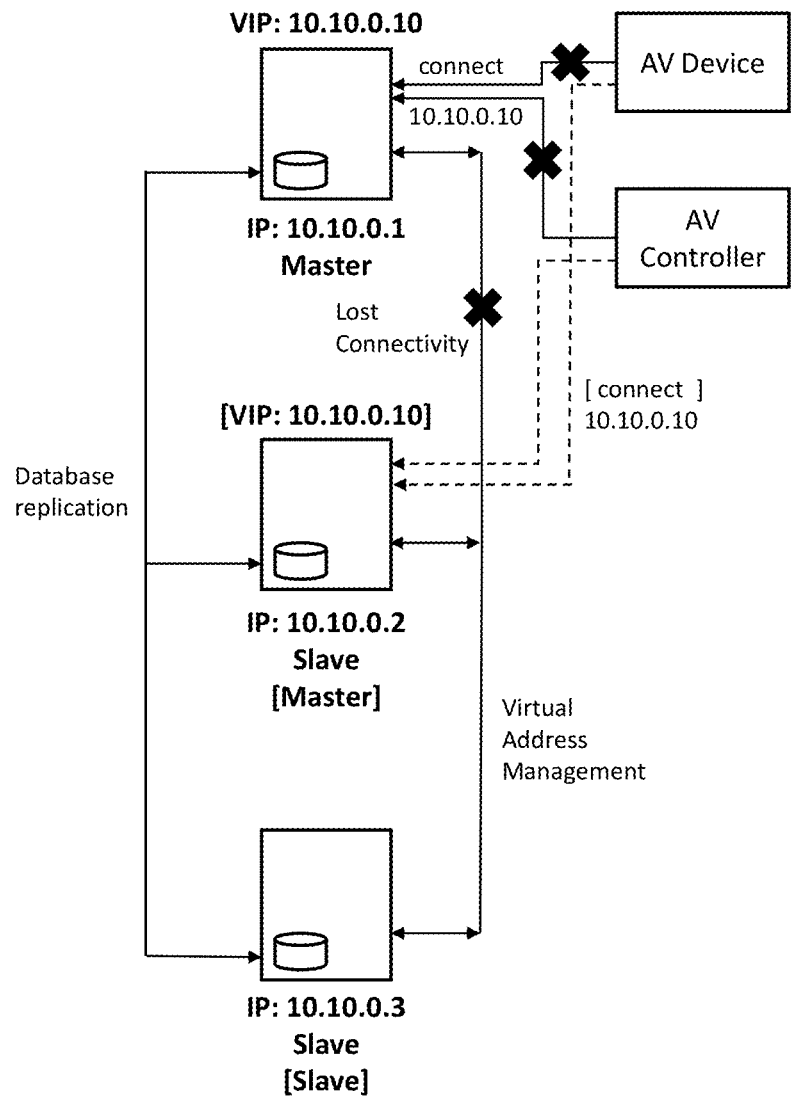
FIG. 16 illustrates an example of a high availability domain manager configuration in accordance with some embodiments described herein.

FIG. 16 illustrates an example of a high availability domain manager configuration. In this diagram three DDM instances are running, with IP addresses 10.10.0.1, 10.10.0.2 and 10.10.0.3. All three share the IP address 10.10.0.10 using a database cluster management protocol, CARP or VRRP to determine the current owner. Initially, the device with IP address 10.10.0.1 owns the address 10.10.0.10 and is the master. Devices and controllers communicate with the DDM using the shared address and thus always communicate with the current master. These are the connections shown in solid lines. The two slaves use database replication techniques to keep their own databases in sync with the current master, as shown in blue. If the current master disappears, 10.10.0.2 takes over as master and obtains the shared address 10.10.0.10. At this point it also becomes database master. Device and controller connection to the previous master are lost, and new connections are made to the device with the shared address, which is now owned by 10.10.0.2. These are the connections shown in dashed lines. 10.10.0.3 remains a slave but now synchronizes its database from the new master. If 10.10.0.1 is restored it becomes a slave and keeps its database in sync with the current master 10.10.0.2.

A Domain Manager as a "Cloud" Service

Figure 17:
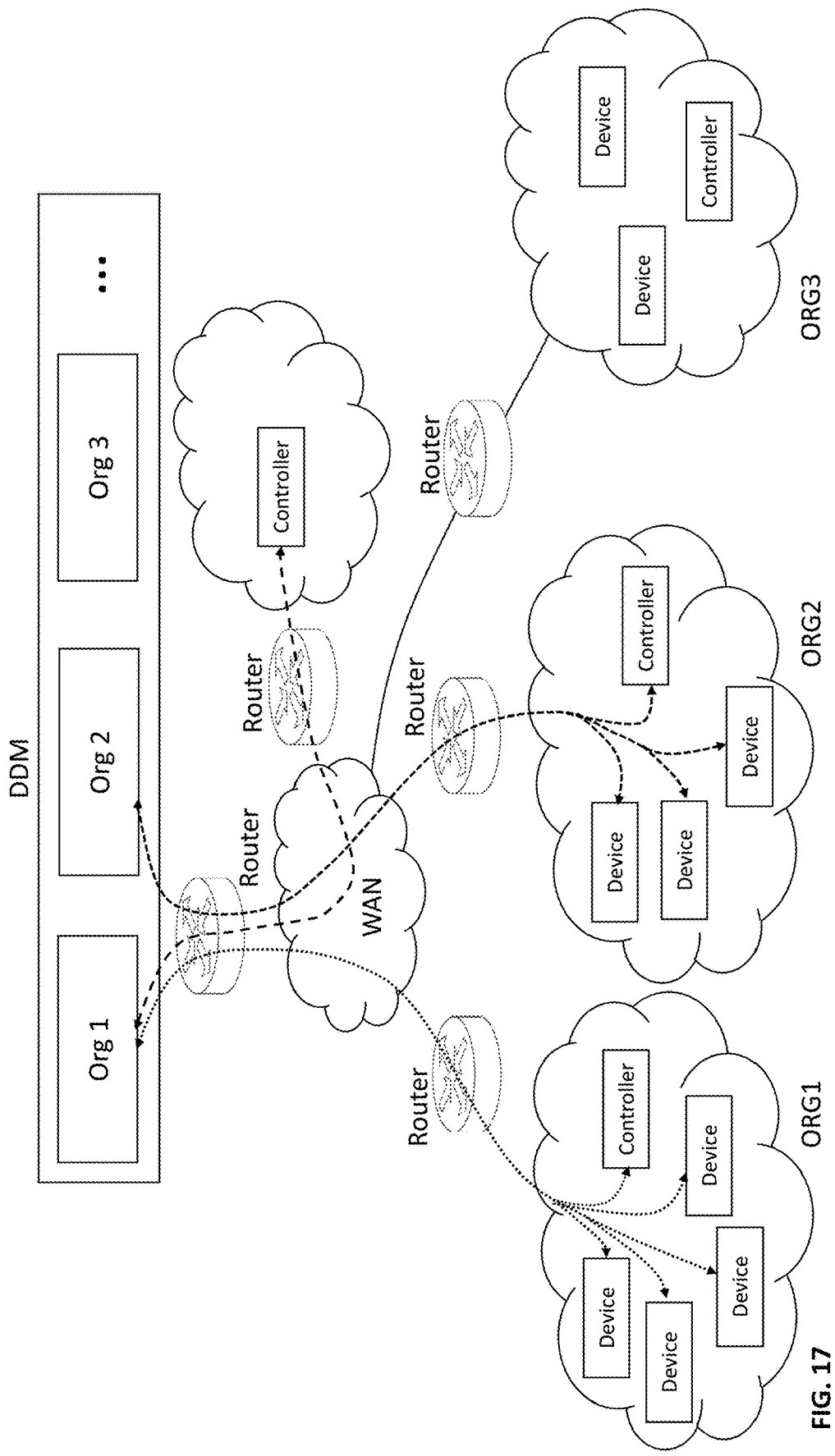
FIG. 17 is an example of a cloud based domain manager in accordance with some embodiments described herein.

As the media network is tolerant to temporary disconnection of the domain manager, the domain manager services could also be implemented as a "cloud" service external to the organizations media network. In such an implementation a multi tenancy domain manager could manage multiple media networks belonging to multiple organizations. In this implementation media controllers could be local to the organizations media network. However it is also possible that a media controller in a remote network could control and monitor the organizations media network via the cloud service. Such a network is illustrated in FIG. 17.

Figure 18:
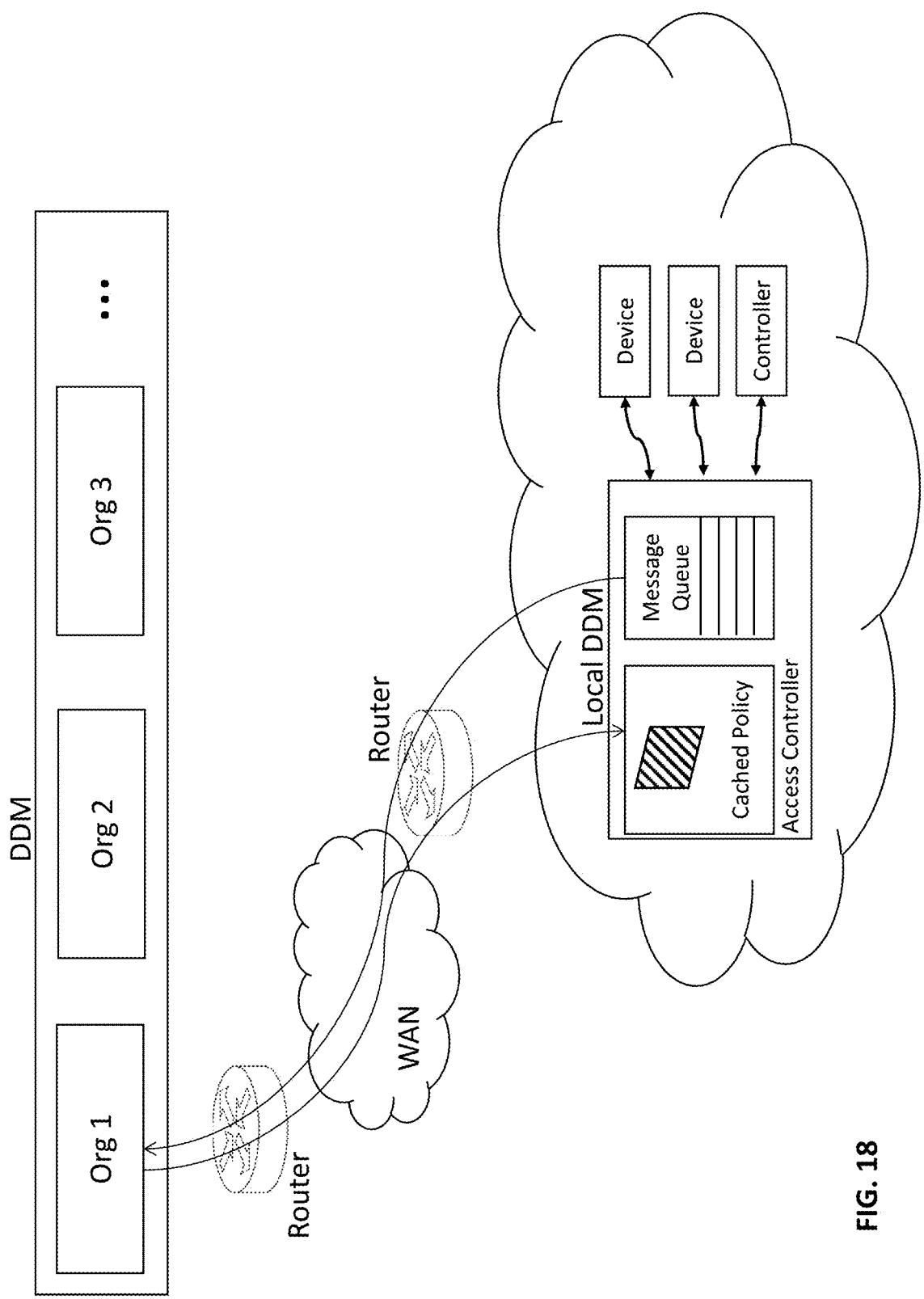
FIG. 18 is an example of a hybrid cloud/local domain manager in accordance with some embodiments described herein.

In some embodiments, it may be that the wide area network connection of an organization may be unreliable, in such a case it is be possible to improve that availability of the domain manager by providing some of the domain manager services locally while others domain manager services are remote. Such an arrangement is illustrated in FIG. 18. For example the local domain manager could provide access control functions with cached policy downloaded from the "cloud". When the "cloud" domain manager is not available audit and event message could be queued in the local domain manager and forwarded to the cloud domain manager when it becomes available.

2.11. Vendor UI Plugins

In some embodiments, vendor plugins may allow vendors to provide control functionality for specific devices within the framework of a domain (e.g., a Dante domain) and its user interfaces, allowing users to manage vendor-specific elements of a device from within a single user interface.

A vendor API allows plugin implementers to see devices in a domain and obtain model information for that device. Vendors can also send & receive vendor-specific messages to/from devices. The domain manager forwards vendor specific messages between devices and UI plugins. Plugins may be stored in a central database separate from the domain manager that includes information about the plugin and the types of devices for which it is applicable. The domain manager can communicate with the plugin database to obtain plugins for devices within its domains, and present device-appropriate plugins to the user when they are working with those devices in the UI.

In some embodiments, the API can be provided in a form allowing plugin integration into a web-oriented UI. It could also be provided as an API in a compiled program language such as Java or C, if the UI were written in those languages. In this instance the UI may need to obtain the plugins from the plugin database itself.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A domain manager comprising:
   a database;
   an endpoint manager implemented in hardware or a combination of hardware and software and configured to communicate with the database, the endpoint manager being configured to setup and maintain secure connections to and from media devices and controllers; and
   at least one management module implemented in hardware or a combination of hardware and software and configured to communicate with the database and provide services to the media devices and controllers;
   wherein the at least one management module includes at least one of a manager for managing credentials and grouping devices into domains, a device directory for managing device registrations and lookup, and an access controller for managing and/or evaluating access control policy; and
   wherein the domain manager further comprises a component that can re-time media signals between two clock domains and generate a tie line packet stream; and
   wherein the media devices are grouped into a plurality of different domains and wherein the media devices in one of the plurality of domains has access to certain media devices in another domain, but not access to the other domain.

2. The domain manager of claim 1, wherein domain manager is configured to manage and configure an audio-video (AV) system but does not directly participate in networked media transmission or clock synchronization.

3. The domain manager of claim 1, wherein the domain manager is virtualized and/or provided as a service delivered by cloud technology.

4. The domain manager of claim 1, wherein the domain manager enables one or more of networked media distribution over routed networks, management of large scale media networks, and fault tolerant media networks.

5. The domain manager of claim 1, wherein media flows and clocking are maintained even if the domain manager is temporarily unavailable because the system is configured to detect and switch to another unicast-capable master clock (from the previously selected candidates) even if the domain manager is not present.

6. The domain manager of claim 1, wherein the domain manager incorporates a device metadata database and associated processes that are reactive to changes in device metadata.

7. The domain manager of claim 1, wherein the domain manager provides prompt notification to controllers and other devices when media devices are connected and disconnected from the network, or when media device metadata changes.

8. The domain manager of claim 1, wherein the domain manager allows controllers to discover a subset of the media devices in a large network, where that subset is defined using flexible queries based on device metadata.

9. The domain manager of claim 1, wherein the domain manager facilitates network management by centralizing information and/or control of devices in a networked media system.

10. The domain manager of claim 1, wherein the domain manager is implemented in software and is configured to manage clocking configuration and media configuration.

11. The domain manager of claim 1, wherein the domain manager provides the ability for a network administrator to define access control policies.

12. The domain manager of claim 1, wherein the domain manager provides the ability for a network administrator to assign access control policies to security principals (for example users (e.g., with associated passphrases/keys), device keys (for controller embedded within media devices), and/or controller API keys (e.g., for controllers that do not support the ability for user login—such as a wall mounted controller)).

13. The domain manager of claim 1, wherein the domain manager provides the ability to evaluate access control policies on the domain manager by forwarding configuration messages via the domain manager to permit complex, fine grain access control policies to be enforced.

14. The domain manager of claim 1, wherein the domain manager provides the ability for access control policies to be pushed from the domain manager to media devices so they can be cached and evaluated on the device without requiring the configuration message to be forwarded via the domain manager.

15. The domain manager of claim 1, wherein the domain manager provides the ability to manage a database of users, passwords, roles, and/or access keys that can be used to assign access controls.

16. The domain manager of claim 1, wherein the domain manager provides the ability to connect to an external sign-on service such as active directory to authenticate and manage users.

17. The domain manager of claim 1, wherein the domain manager improves the collection and display of statistics and performance information in one or more of the following manners: acting as a centralized storage for this information; collecting both live and historical information; interfacing via appropriate APIs with external data analytic services to better analyze and visualize this information; using appropriate data storage architectures such as time series databases so that the data can be easily analyzed and aggregated; generating alerts in the event of errors or performance information reaching particular thresholds; and converting alerts to a form such as simple network management protocol (SNMP) so they can be received by third party network management tools.

18. The domain manager of claim 1, wherein a single domain manager can manage multiple domains.

19. The domain manager of claim 1, wherein the domain manager may be able to handle both legacy and domain-aware devices.

* * * * *